US011885339B2

(12) United States Patent
Teramoto et al.

(10) Patent No.: US 11,885,339 B2
(45) Date of Patent: Jan. 30, 2024

(54) TURBO FAN, AIR SENDING DEVICE, AIR-CONDITIONING DEVICE, AND REFRIGERATION CYCLE DEVICE

(71) Applicant: Mitsubishi Electric Corporation, Tokyo (JP)

(72) Inventors: Takuya Teramoto, Tokyo (JP); Hiroyasu Hayashi, Tokyo (JP); Atsushi Kono, Tokyo (JP); Ryo Horie, Tokyo (JP); Kazuya Michikami, Tokyo (JP); Takahiro Yamatani, Tokyo (JP); Hiroshi Tsutsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 249 days.

(21) Appl. No.: 17/288,319

(22) PCT Filed: Oct. 30, 2018

(86) PCT No.: PCT/JP2018/040324
§ 371 (c)(1),
(2) Date: Apr. 23, 2021

(87) PCT Pub. No.: WO2020/090005
PCT Pub. Date: May 7, 2020

(65) Prior Publication Data
US 2021/0372411 A1 Dec. 2, 2021

(51) Int. Cl.
*F04D 17/10* (2006.01)
*F04D 29/58* (2006.01)
(Continued)

(52) U.S. Cl.
CPC ........... *F04D 17/10* (2013.01); *F04D 17/162* (2013.01); *F04D 29/281* (2013.01);
(Continued)

(58) Field of Classification Search
CPC ...... F04D 17/10; F04D 17/162; F04D 29/281; F04D 29/424; F04D 29/5826; F24F 1/0022; F05D 2250/52
See application file for complete search history.

(56) References Cited

U.S. PATENT DOCUMENTS 9,267,507 B2 * 2/2016 Wu ....................... F04D 17/162
2006/0081366 A1 4/2006 Chiu et al.
(Continued)

FOREIGN PATENT DOCUMENTS

CN 202284569 U 6/2012
DE 3804113 A * 8/1989 ........... F04D 29/283
(Continued)

OTHER PUBLICATIONS

Office Action dated Jun. 15, 2022 issued in corresponding CN Patent Application No. 201880099112.3 (and English translation).
(Continued)

*Primary Examiner* — Audrey B. Walter
(74) *Attorney, Agent, or Firm* — POSZ LAW GROUP, PLC

(57) ABSTRACT

A turbo fan includes a main plate and a plurality of blade portions. The plurality of blade portions include a plurality of first blade portions and a plurality of second blade portions. In a case where, in each of the plurality of first blade portions, a length of a virtual straight line connecting a first inner peripheral end part and a first outer peripheral end part is defined as a first chord length, and in each of the plurality of second blade portions, a length of a virtual straight line connecting a second inner peripheral end part and a second outer peripheral end part is defined as a second chord length, the first chord length and the second chord
(Continued)

length are not equal to each other at positions separated by a same distance from the main plate in the axial direction of the rotary shaft.

14 Claims, 17 Drawing Sheets

(51) Int. Cl.
*F24F 1/00* (2019.01)
*F04D 29/28* (2006.01)
*F04D 29/42* (2006.01)
*F04D 17/16* (2006.01)
*F24F 1/0022* (2019.01)

(52) U.S. Cl.
CPC ....... *F04D 29/424* (2013.01); *F04D 29/5826* (2013.01); *F24F 1/0022* (2013.01); *F05D 2250/52* (2013.01)

(56) References Cited

U.S. PATENT DOCUMENTS

| | | | | |
|---|---|---|---|---|
| 2009/0162198 | A1 | 6/2009 | Ogino et al. | |
| 2014/0072434 | A1* | 3/2014 | Wu | F04D 29/666 416/198 R |
| 2014/0157613 | A1 | 6/2014 | McLain | |
| 2015/0275901 | A1* | 10/2015 | Yang | G06F 1/203 361/679.48 |
| 2017/0234323 | A1 | 9/2017 | Pirouzpanah et al. | |
| 2018/0238351 | A1 | 8/2018 | Kono et al. | |
| 2018/0283395 | A1 | 10/2018 | Sato | |

FOREIGN PATENT DOCUMENTS

| | | | |
|---|---|---|---|
| JP | S63-025397 | A | 2/1988 |
| JP | H03-502478 | A | 6/1991 |
| JP | H06-047698 | U | 6/1994 |
| JP | H08-035500 | A | 2/1996 |
| JP | H09-126200 | A | 5/1997 |
| JP | 2000-283518 | A | 10/2000 |
| JP | 2001-056138 | A | 2/2001 |
| JP | 2006-112415 | A | 4/2006 |
| JP | 2008-031982 | A | 2/2008 |
| JP | 2009-243405 | A | 10/2009 |
| JP | 2011-052626 | A | 3/2011 |
| JP | 2011-202821 | A | 10/2011 |
| JP | 2013-185565 | A | 9/2013 |
| JP | 2018-150910 | A | 9/2018 |
| WO | 89/07716 | A1 | 8/1989 |
| WO | 2008/111368 | A1 | 9/2008 |
| WO | 2017/060987 | A1 | 10/2015 |
| WO | 2016/190454 | A1 | 12/2016 |

OTHER PUBLICATIONS

Office Action dated Feb. 2, 2023 issued in corresponding CN Patent Application No. 201880099112.3 (and English machine translation).
Office Action dated Feb. 7, 2023 issued in corresponding JP Patent Application No. 2020-554644 (and English machine translation).
International Search Report of the International Searching Authority dated Jan. 22, 2019 for the corresponding International application No. PCT/JP2018/040324 (and English translation).
The Extended European Search Report dated Sep. 15, 2021 issued in corresponding EP application No. 18938868.9.
Office Action dated Mar. 29, 2022 issued in corresponding JP patent application No. 2020-554644 (and English translation).
Office Action dated Dec. 14, 2021 issued in corresponding JP patent application No. 2020-554644 (and English translation).
Office Action dated Aug. 23, 2022 issued in corresponding JP Patent Application No. 2020-554644 (and English translation).
Decision of Rejection dated Jun. 13, 2023 issued in corresponding CN Patent Application No. 2018800991123 (and English machine translation).
Office Action dated Sep. 5, 2023 issued in corresponding European Patent Application No. 18938868.9.

* cited by examiner

TURBO FAN, AIR SENDING DEVICE, AIR-CONDITIONING DEVICE, AND REFRIGERATION CYCLE DEVICE

CROSS REFERENCE TO RELATED APPLICATION

This application is a U.S. national stage application of PCT/JP2018/040324 filed on Oct. 30, 2018, the contents of which are incorporated herein by reference.

TECHNICAL FIELD

The present disclosure relates to a turbo fan in which blade portions are provided on both sides of a main plate, and to an air-sending device, an air-conditioning device, and a refrigeration cycle device each including the turbo fan.

BACKGROUND ART

A double-suction turbo fan in which two turbo fans are provided back to back has been proposed (for example, see Patent Literature 1).

CITATION LIST

Patent Literature

Patent Literature 1: Japanese Unexamined Patent Application Publication No. 2011-202821

SUMMARY OF INVENTION

Technical Problem

In the turbo fan disclosed in Patent Literature 1, blade portions are provided on both sides of a main plate. Further, in the turbo fan disclosed in Patent Literature 1, a single blade on one side and a single blade on other side have the same shape. However, in a case where a chord length on the one side and a chord length on the other side are equal to each other in the turbo fan in which the blade portions are provided on both sides of the main plate, airflows discharged from the blade portions may interfere with one another, which may increase noise.

The present disclosure is made to solve the above-described issues, and to provide a turbo fan, an air-sending device, an air-conditioning device, and a refrigeration cycle device each suppressing interference between airflows discharged from blade portions and reducing noise in a turbo fan in which the blade portions are provided on both sides of a main plate.

Solution to Problem

A turbo fan according to one embodiment of the present disclosure includes a main plate rotationally driven, and a plurality of blade portions arranged at intervals in a circumferential direction on the main plate. The plurality of blade portions include a plurality of first blade portions arranged on one of plate surfaces of the main plate, and a plurality of second blade portions arranged on another plate surface of the main plate. In a case where, in each of the plurality of first blade portions, a length of a virtual straight line connecting a first inner peripheral end part positioned on a rotary shaft side in a radial direction of the main plate and a first outer peripheral end part positioned on an outer edge side of the main plate is defined as a first chord length, and in each of the plurality of second blade portions, a length of a virtual straight line connecting a second inner peripheral end part positioned on the rotary shaft side in the radial direction of the main plate and a second outer peripheral end part positioned on the outer edge side of the main plate is defined as a second chord length, the first chord length and the second chord length are not equal to each other at positions separated by a same distance from the main plate in the axial direction of the rotary shaft.

Advantageous Effects of Invention

In the turbo fan according to the embodiment of the present disclosure, the chord length of each of the first blade portions arranged on the one plate surface of the main plate and the chord length of each of the second blade portions arranged on the other plate surface of the main plate are not equal to each other. Therefore, in the turbo fan, a speed difference occurs between airflows passing through the first blade portions and airflows passing through the second blade portions, and phases of the airflows discharged from the respective blade portions can be shifted from each other. As a result, the turbo fan can suppress interference of the airflows discharged from the blade portions, thereby reducing noise.

DESCRIPTION OF EMBODIMENTS

Figure 1:
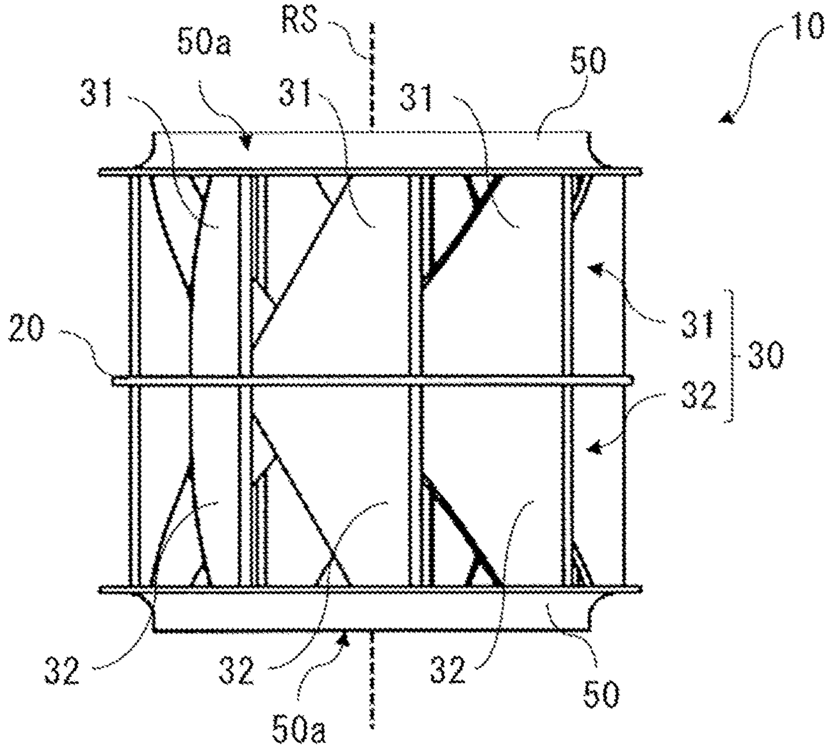
FIG. 1 is a side view of a turbo fan according to Embodiment 1 of the present disclosure.

Hereinafter, turbo fans 10 to 10J, an air-sending device 130, an air-conditioning device 140, and a refrigeration cycle device 150 according to embodiments of the present disclosure are described with reference to drawings. In the following drawings including FIG. 1, relative dimensional relationship, shapes, and the like of components may be different from relative dimensional relationship, shapes, and the like of actual components. Further, in the following drawings, the same or equivalent components are denoted by the same reference numerals, and the same applies throughout the entire text of the specification. To facilitate understanding, terms indicating directions (for example, "upper", "lower", "right", "left", "front", and "rear") are properly used; however, these terms are used for convenience of description, and do not limit arrangement and directions of devices and parts.

Embodiment 1

[Turbo Fan 10]

Figure 2:
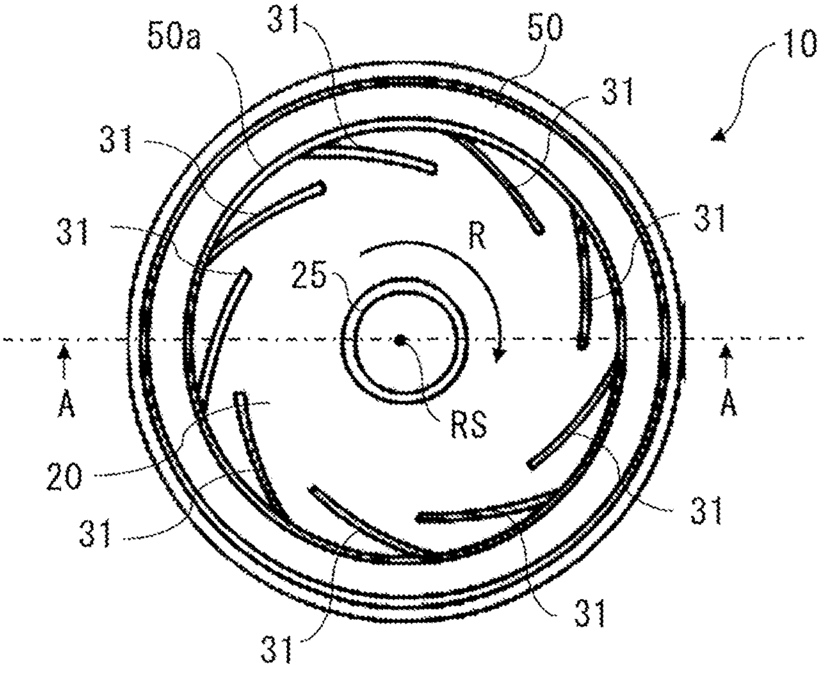
FIG. 2 is a top view of the turbo fan according to Embodiment 1 of the present disclosure.
Figure 3:
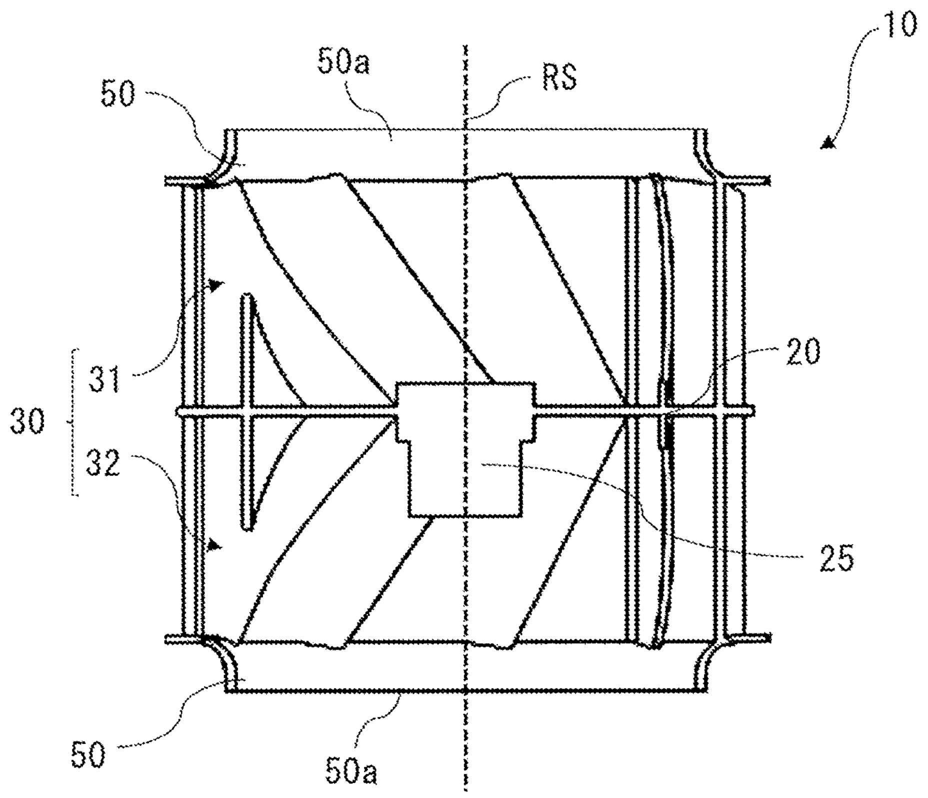
FIG. 3 is a schematic cross-sectional view taken along line A-A of the turbo fan in FIG. 2.

FIG. 1 is a side view of a turbo fan 10 according to Embodiment 1 of the present disclosure. FIG. 2 is a top view of the turbo fan 10 according to Embodiment 1 of the present disclosure. FIG. 3 is a schematic cross-sectional view taken along line A-A of the turbo fan 10 in FIG. 2. A basic configuration of the turbo fan 10 is described with reference to FIG. 1 to FIG. 3. The turbo fan 10 is rotationally driven by a motor or the like (not illustrated), and forcibly sends air outward in a radial direction by centrifugal force generated by rotation. The turbo fan 10 is used for, for example, an indoor unit of an air-conditioning device, and includes a main plate 20 and blade portions 30. The turbo fan 10 further includes annular side plates 50 at ends of the blade portions 30 on a side opposite to the main plate 20 in an axial direction of a rotary shaft RS.

(Main Plate 20)

The main plate 20 has a disc shape. As illustrated in FIG. 2 and FIG. 3, the main plate 20 includes, at a center part, a boss portion 25 connected to a rotary shaft of the motor. The main plate 20 is rotationally driven around the rotary shaft RS when the motor (not illustrated) is driven. Note that the main plate 20 may have a shape (for example, polygonal shape) other than the disc shape as long as the main plate 20 has a plate shape.

(Blade Portion 30)

The blade portions 30 rotate together with the main plate 20 when the main plate 20 rotates, and move in a circumferential direction of the main plate 20 to generate airflows directed from a center toward an outer periphery of the main plate 20. The plurality of blade portions 30 are arranged at predetermined intervals in the circumferential direction of the main plate 20. The blade portions 30 extend rearward in a rotation direction R of the main plate 20. The plurality of blade portions 30 are circumferentially arranged around the rotary shaft RS, and base ends of the blade portions 30 are fixed to the main plate 20. The blade portions 30 include first blade portions 31 and second blade portions 32. The first blade portions 31 are arranged on one of plate surfaces of the main plate 20, and the second blade portions 32 are arranged on the other plate surface of the main plate 20. In other words, the plurality of blade portions 30 are provided on both sides of the main plate 20 in the axial direction of the rotary shaft RS, and the first blade portions 31 and the second blade portions 32 are provided back to back with the main plate 20 in between. In FIG. 1 and FIG. 3, the first blade portions 31 are arranged on an upper part of the main plate 20, and the second blade portions 32 are arranged on a lower part of the main plate 20. Alternatively, the first blade portions 31 may be arranged on the lower part of the main plate 20 and the second blade portions 32 may be arranged on the upper part of the main plate 20 as long as the first blade portions 31 and the second blade portions 32 are provided back to back with the main plate 20 in between. Each of the blade portions 30 is formed as a two-dimensional blade in which the same cross-sectional shape continues in the axial direction of the rotary shaft RS; however, each of the blade portions 30 may be a three-dimensional blade having a twisted shape. In the following description, the blade portions 30 are used as general terms of the first blade portions 31 and the second blade portions 32 unless otherwise noted.

Figure 4:
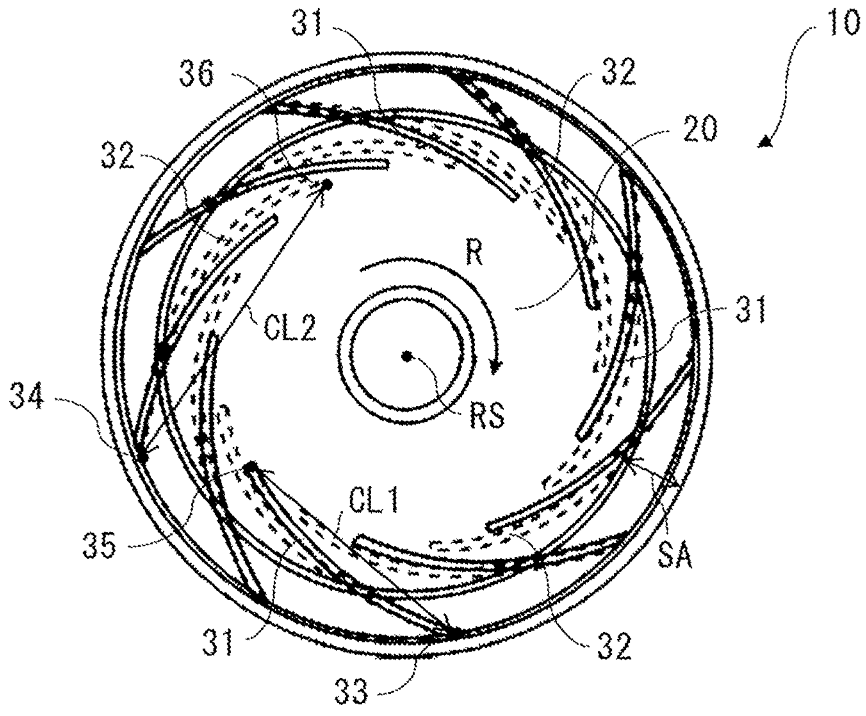
FIG. 4 is a conceptual diagram illustrating arrangement of first blade portions and second blade portions to a main plate in FIG. 1.

FIG. 4 is a conceptual diagram illustrating arrangement of the first blade portions 31 and the second blade portions 32 to the main plate 20 in FIG. 1. FIG. 4 illustrates positional relationship of the main plate 20, the first blade portions 31, and the second blade portions 32 as viewed in the axial direction of the rotary shaft RS. In a cross-section in a direction perpendicular to the rotary shaft RS, blade outer peripheral ends of the first blade portions 31 are referred to as first outer peripheral end parts 33, and blade inner peripheral ends of the first blade portions 31 are referred to as first inner peripheral end parts 35. The first inner peripheral end parts 35 are positioned on the rotary shaft RS side in the radial direction of the main plate 20, and the first outer peripheral end parts 33 are positioned on an outer edge side of the main plate 20. A length of a virtual straight line connecting the first outer peripheral end part 33 and the first inner peripheral end part 35 of each of the first blade portions 31 is defined as a first chord length CL1. In other words, the first chord length CL1 is a length of a straight line connecting a leading edge and a trailing edge of each of the first blade portions 31.

Further, in the cross-section in the direction perpendicular to the rotary shaft RS, blade outer peripheral ends of the second blade portions 32 are referred to as second outer peripheral end parts 34, and blade inner peripheral ends of the second blade portions 32 are referred to as second inner peripheral end parts 36. The second inner peripheral end parts 36 are positioned on the rotary shaft RS side in the radial direction of the main plate 20, and the second outer peripheral end parts 34 are positioned on the outer edge side of the main plate 20. A length of a virtual straight line connecting the second outer peripheral end part 34 and the second inner peripheral end part 36 of each of the second blade portions 32 is defined as a second chord length CL2. In other words, the second chord length CL2 is a length of a straight line connecting a leading edge and a trailing edge of each of the second blade portions 32.

Here, the first chord length CL1 and the second chord length CL2 positioned at the same distance from the main plate 20 in the axial direction of the rotary shaft RS are compared. At this time, it is assumed that the first outer peripheral end parts 33 and the second outer peripheral end parts 34 are positioned at the same distance from the main plate 20 in the axial direction of the rotary shaft RS, and the first inner peripheral end parts 35 and the second inner peripheral end parts 36 are positioned at the same distance from the main plate 20 in the axial direction of the rotary shaft RS. Note that, in a case where each of the blade portions 30 is the three-dimensional blade having the twisted shape, for example, the first chord length CL1 and the second chord length CL2 may be lengths at a position where each of the blade portions 30 and the main plate 20 are connected.

In the blade portions 30, the chord length of each of the first blade portions 31 and the chord length of each of the second blade portions 32 are not equal to each other, and the blade inner peripheral ends of the first blade portions 31 and the blade inner peripheral ends of the second blade portions 32 are different in phase in the circumferential direction around the rotary shaft RS. More specifically, in the blade portions 30, the first chord length CL1 of each of the first blade portions 31 and the second chord length CL2 of each of the second blade portions 32 are not equal to each other at positions separated by the same distance from the main plate 20 in the axial direction of the rotary shaft RS of the main plate 20. Further, the first outer peripheral end parts 33 and the second outer peripheral end parts 34 of the blade portions 30 are disposed at the same positions in the radial direction of the main plate 20 and are disposed at the same positions in the radial direction of the main plate 20. Further, the first inner peripheral end parts 35 and the second inner peripheral end parts 36 of the blade portions 30 are disposed at different positions in the radial direction of the main plate 20 or are disposed at different positions in the circumferential direction of the main plate 20. The first chord length CL1 of each of the first blade portions 31 and the second chord length CL2 of each of the second blade portions 32 are not equal to each other, and the first outer peripheral end parts 33 of the first blade portions 31 and the second outer peripheral end parts 34 of the second blade portions 32 are coincident in phase in the circumferential direction around the rotary shaft RS and are coincident in distance in the radial direction around the rotary shaft RS. In other words, the blade phases of the first blade portions 31 and the blade phases of the second blade portions 32 are shifted only on the inner peripheral side but are coincident on the outer peripheral side.

(Side Plate 50)

Referring back to FIG. 1 to FIG. 3, the side plates 50 are what are called shrouds. Each of the side plates 50 has a bell-mouth shape, and has an air inlet 50*a* at a center part. The side plates 50 function as bell mouths. Each of the side plates 50 and the main plate 20 are disposed to face to each other. In the turbo fan 10, a range surrounded by the main plate 20, a pair of adjacent blade portions 30, and one of the side plates 50 serves as a flow path of airflows, and the first outer peripheral end parts 33 and the second outer peripheral end parts 34 that are end parts on the outer peripheral side serve as air outlets. The side plates 50 couple the plurality of blade portions 30 to maintain positional relationship of front ends of the respective blade portions 30 and to reinforce the plurality of blade portions 30. In a case where the turbo fan 10 has the side plates 50, each of the plurality of blade portions 30 has one end connected to the main plate 20 and the other end connected to one of the side plates 50, and the plurality of blade portions 30 are disposed between the main plate 20 and each of the side plates 50.

Figure 5:
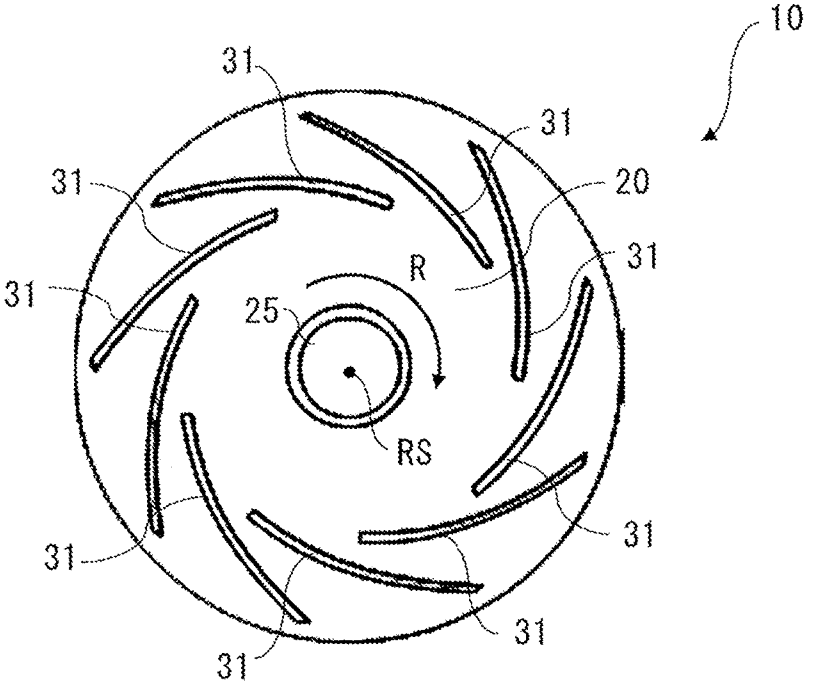
FIG. 5 is a top view of a modification of the turbo fan.
Figure 6:
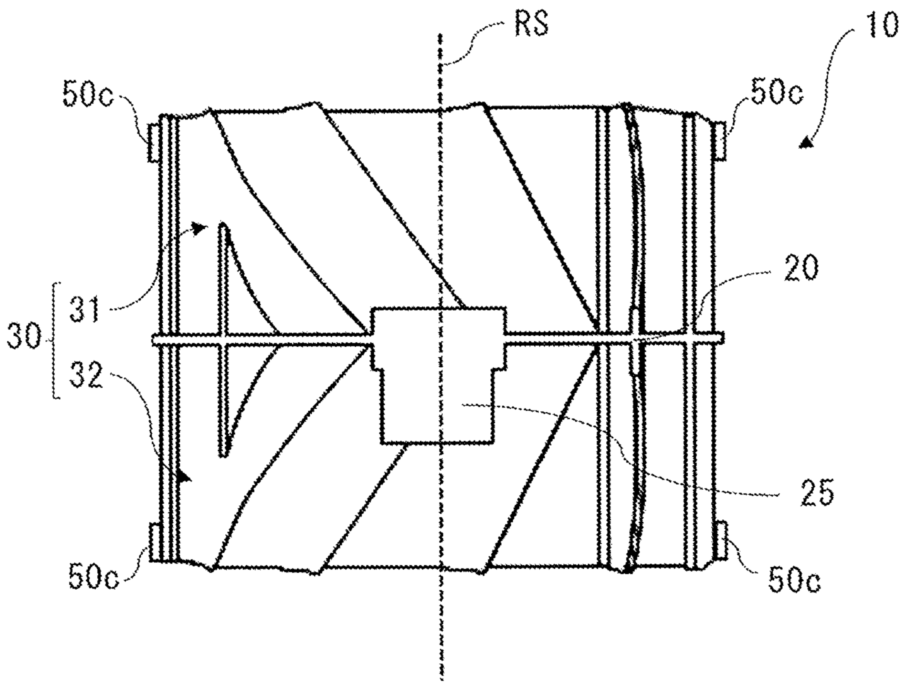
FIG. 6 is a schematic cross-sectional view of another modification of the turbo fan.

FIG. 5 is a top view of a modification of the turbo fan 10. FIG. 6 is a schematic cross-sectional view of another modification of the turbo fan 10. As illustrated in FIG. 5 and FIG. 6, the turbo fan 10 may have a configuration including no side plate 50. Further, as illustrated in FIG. 6, the turbo fan 10 may have outer peripheral rings 50*c* each formed in an annular shape, in plate of the bell-mouth-shaped side plates 50.

[Operation of Turbo Fan 10]

When the main plate 20 of the turbo fan 10 rotates by rotation of the motor connected to the boss portion 25, the blade portions 30 move in the circumferential direction of the main plate 20. When the main plate 20 rotates, air outside the turbo fan 10 is suctioned into a space surrounded by the main plate 20 and the plurality of blade portions 30 through the air inlets 50*a*. Further, when the blade portions 30 rotate together with the main plate 20 in the circumferential direction of the main plate 20 in the turbo fan 10, the air suctioned into the space surrounded by the main plate 20 and the plurality of blade portions 30 is sent outward in the radial direction of the main plate 20 through a space between the adjacent blade portions 30.

[Action and Effects of Turbo Fan 10]

As described above, in the turbo fan 10, the chord length of each of the first blade portions 31 arranged on the one plate surface of the main plate 20 and the chord length of each of the second blade portions 32 arranged on the other plate surface of the main plate 20 are not equal to each other. Therefore, in the turbo fan 10, a speed difference occurs between the airflows passing through the first blade portions 31 and the airflows passing through the second blade portions 32, and the phases of the airflows discharged from the respective blade portions 30 can be shifted from each other. As a result, the turbo fan 10 can suppress interference of the airflows discharged from the blade portions 30, thereby reducing noise.

Further, the first inner peripheral end parts 35 and the second inner peripheral end parts 36 of the blade portions 30 are disposed at different positions in the radial direction of the main plate 20 or are disposed at different positions in the circumferential direction of the main plate 20. Therefore, in the turbo fan 10, the speed difference occurs between the airflows passing through the first blade portions 31 and the airflows passing through the second blade portions 32, and the phases of the airflows discharged from the respective blade portions 30 can be shifted from each other. As a result, the turbo fan 10 can suppress interference of the airflows discharged from the blade portions 30, thereby reducing noise.

For example, in a case where a plurality of turbo fans are mounted on an air-conditioning apparatus, it is necessary to use motors for the respective turbo fans. The turbo fan 10 has the configuration in which the two types of blade portions 30 are provided back to back with the main plate 20 in between, and enables reduction of the number of motors as compared with a case where two turbo fans each including the blade portions provided only on one of plate surfaces of a main plate are used.

Further, the first outer peripheral end parts 33 and the second outer peripheral end parts 34 of the blade portions 30 are disposed at the same positions in the radial direction of the main plate 20 and are disposed at the same positions in the circumferential direction of the main plate 20. When the first outer peripheral end parts 33 and the second outer peripheral end parts 34 that are outer peripheral ends of the blade portions 30 are aligned in phase, it is possible to simultaneously demold the first blade portions 31 and the second blade portions 32 in demolding. More specifically, when the phases of the blade portions 30 within a range SA of each of the side plates 50 illustrated in FIG. 4 are aligned, it is possible to simultaneously demold the first blade portions 31 and the second blade portions 32 in demolding. Accordingly, the turbo fan 10 enables reduction in molding cost in manufacturing of the turbo fan 10. Further, the first inner peripheral end parts 35 and the second inner peripheral end parts 36 that are inner peripheral ends of the blade portions 30 are demolded in a vertical direction, which facilitates manufacturing of the turbo fan 10.

In addition, since the turbo fan 10 includes one plate-shaped main plate 20, the turbo fan 10 can be formed in a minimum shape.

Embodiment 2

Figure 7:
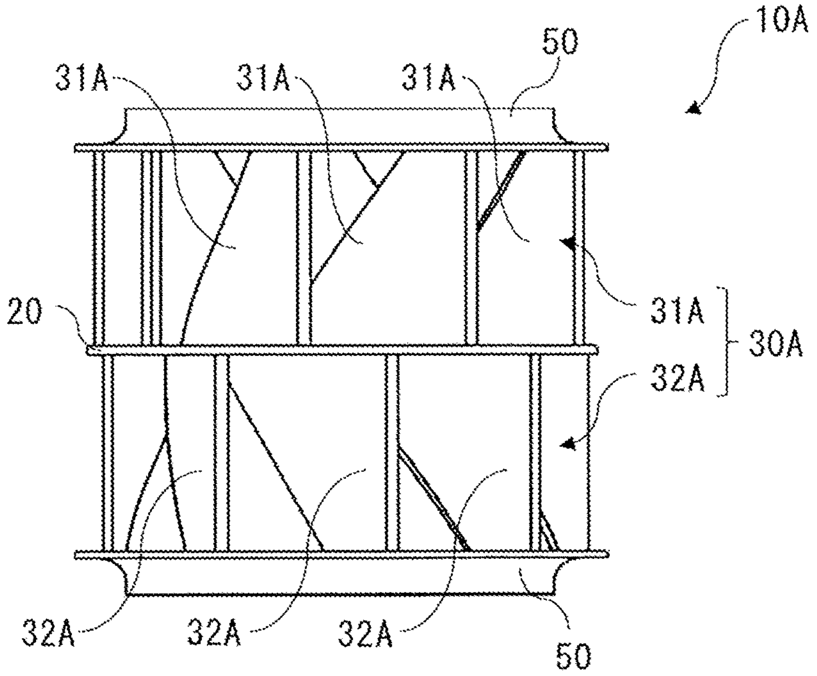
FIG. 7 is a side view of a turbo fan according to Embodiment 2 of the present disclosure.
Figure 8:
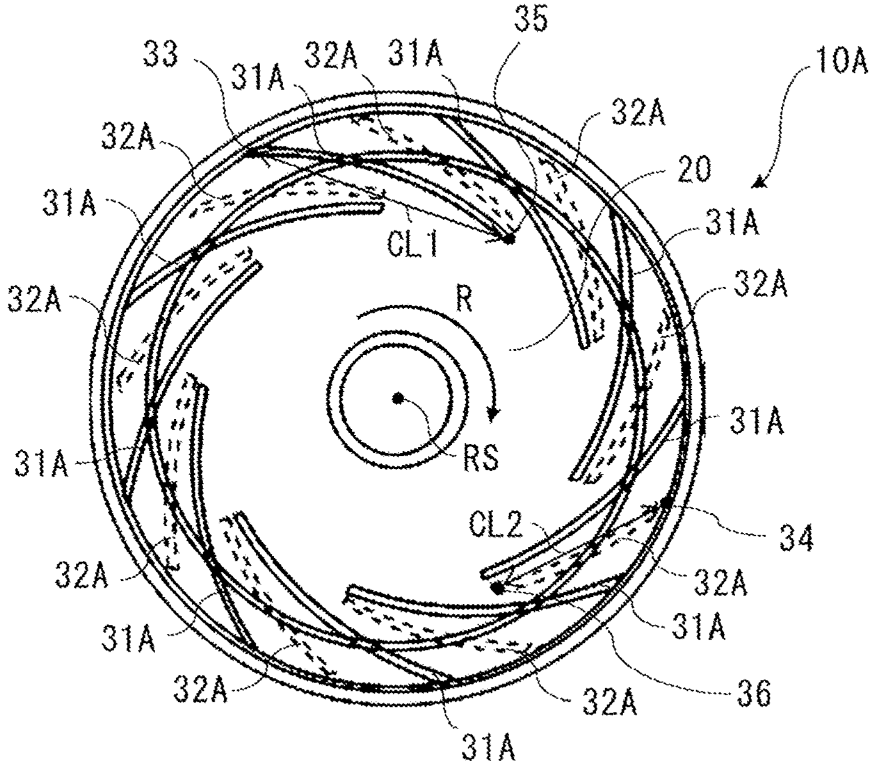
FIG. 8 is a conceptual diagram illustrating arrangement of first blade portions and second blade portions to a main plate in FIG. 7.

FIG. 7 is a side view of a turbo fan 10A according to Embodiment 2 of the present disclosure. FIG. 8 is a conceptual diagram illustrating arrangement of first blade portions 31A and second blade portions 32A to the main plate 20 in FIG. 7. Note that components having the same configuration as in the turbo fan 10 in FIG. 1 to FIG. 6 are denoted by the same reference numerals, and descriptions of the components are omitted. The turbo fan 10A according to Embodiment 2 is different from the turbo fan 10 according to Embodiment 1 in phases of the first blade portions 31A and the second blade portions 32A. Therefore, in the following description, configurations of blade portions 30A of the turbo fan 10A according to Embodiment 2 are mainly described with reference to FIG. 7 and FIG. 8.

(Blade Portion 30A)

When the main plate 20 rotates, the blade portions 30A rotate together with the main plate 20 and move in the circumferential direction of the main plate 20, thereby generating airflows directed from the center toward the outer periphery of the main plate 20. The plurality of blade portions 30A are arranged at predetermined intervals in the circumferential direction of the main plate 20. The plurality of blade portions 30A are circumferentially arranged around the rotary shaft RS, and base ends of the blade portions 30A are fixed to the main plate 20. The blade portions 30A include first blade portions 31A and second blade portions 32A. The first blade portions 31A are arranged on one of plate surfaces of the main plate 20, and the second blade portions 32A are arranged on the other plate surface of the main plate 20. In other words, the plurality of blade portions 30A are provided on both sides of the main plate 20 in the axial direction of the rotary shaft RS, and the first blade portions 31A and the second blade portions 32A are provided back to back with the main plate 20 in between. In FIG. 7 and FIG. 8, the first blade portions 31A are arranged on the upper part of the main plate 20, and the second blade portions 32A are arranged on the lower part of the main plate 20. Alternatively, the first blade portions 31A may be arranged on the lower part of the main plate 20 and the second blade portions 32A may be arranged on the upper part of the main plate 20 as long as the first blade portions 31A and the second blade portions 32A are provided back to back with the main plate 20 in between. Each of the blade portions 30A may be formed such that the same cross-sectional shape of the blade continues in the axial direction of the rotary shaft RS, or may be a three-dimensional blade having a twisted shape.

FIG. 8 illustrates positional relationship of the main plate 20, the first blade portions 31A, and the second blade portions 32A as viewed in the axial direction of the rotary shaft RS. In the cross-section in the direction perpendicular to the rotary shaft RS, blade outer peripheral ends of the first blade portions 31A are referred to as the first outer peripheral end parts 33, and blade inner peripheral ends of the first blade portions 31A are referred to as the first inner peripheral end parts 35. In addition, a length of a straight line connecting the first outer peripheral end part 33 and the first inner peripheral end part 35 of each of the first blade portions 31A is defined as the first chord length CL1. Further, in the cross-section in the direction perpendicular to the rotary shaft RS, blade outer peripheral ends of the second blade portions 32A are referred to as the second outer peripheral end parts 34, and blade inner peripheral ends of the second blade portions 32A are referred to as the second inner peripheral end parts 36. In addition, a length of a straight line connecting the second outer peripheral end part 34 and the second inner peripheral end part 36 of each of the second blade portions 32A is defined as the second chord length CL2. Here, the first chord length CL1 and the second chord length CL2 positioned at the same distance from the main plate 20 in the axial direction of the rotary shaft RS are compared. At this time, it is assumed that the first outer peripheral end parts 33 and the second outer peripheral end parts 34 are positioned at the same distance from the main plate 20 in the axial direction of the rotary shaft RS, and the first inner peripheral end parts 35 and the second inner peripheral end parts 36 are positioned at the same distance from the main plate 20 in the axial direction of the rotary shaft RS. Note that, in the case where each of the blade portions 30A is the three-dimensional blade having the twisted shape, for example, the first chord length CL1 and the second chord length CL2 may be lengths at a position where each of the blade portions 30A and the main plate 20 are connected.

In the blade portions 30A, the chord length of each of the first blade portions 31A and the chord length of each of the second blade portions 32A are not equal to each other, and the first blade portions 31A and the second blade portions 32A are different in phase in the circumferential direction around the rotary shaft RS. More specifically, in the blade portions 30A, the first chord length CL1 of each of the first blade portions 31A and the second chord length CL2 of each of the second blade portions 32A at positions separated by the same distance from the main plate 20 in the axial direction of the rotary shaft RS of the main plate 20 are not equal to each other. Further, the first outer peripheral end parts 33 and the second outer peripheral end parts 34 of the blade portions 30A are disposed at different positions in the radial direction of the main plate 20 or are disposed at different positions in the circumferential direction of the main plate 20. Furthermore, the first inner peripheral end parts 35 and the second inner peripheral end parts 36 of the blade portions 30A are disposed at different positions in the radial direction of the main plate 20 or are disposed at different positions in the circumferential direction of the main plate 20.

[Action and Effects of Turbo Fan 10A]

As described above, in the turbo fan 10A, the chord length of each of the first blade portions 31A arranged on the one plate surface of the main plate 20 and the chord length of each of the second blade portions 32A arranged on the other plate surface of the main plate 20 are not equal to each other. Therefore, in the turbo fan 10A, a speed difference occurs between the airflows passing through the first blade portions 31A and the airflows passing through the second blade portions 32A, and the phases of the airflows discharged from the respective blade portions 30A can be shifted from each other. As a result, the turbo fan 10A can suppress interference of the airflows discharged from the blade portions 30A, thereby reducing noise.

Further, the first outer peripheral end parts 33 and the second outer peripheral end parts 34 of the blade portions 30A are disposed at different positions in the radial direction of the main plate 20 or are disposed at different positions in the circumferential direction of the main plate 20. In addition, the first inner peripheral end parts 35 and the second inner peripheral end parts 36 of the blade portions 30A are disposed at different positions in the radial direction of the main plate 20 or are disposed at different positions in the circumferential direction of the main plate 20. Therefore, in the turbo fan 10A, the phases of the airflows passing through the first blade portions 31A and the phases of the airflows passing through the second blade portions 32A can be shifted from each other. As a result, the turbo fan 10A can suppress interference of the airflows discharged from the blade portions 30A, thereby reducing noise.

Embodiment 3

Figure 9:
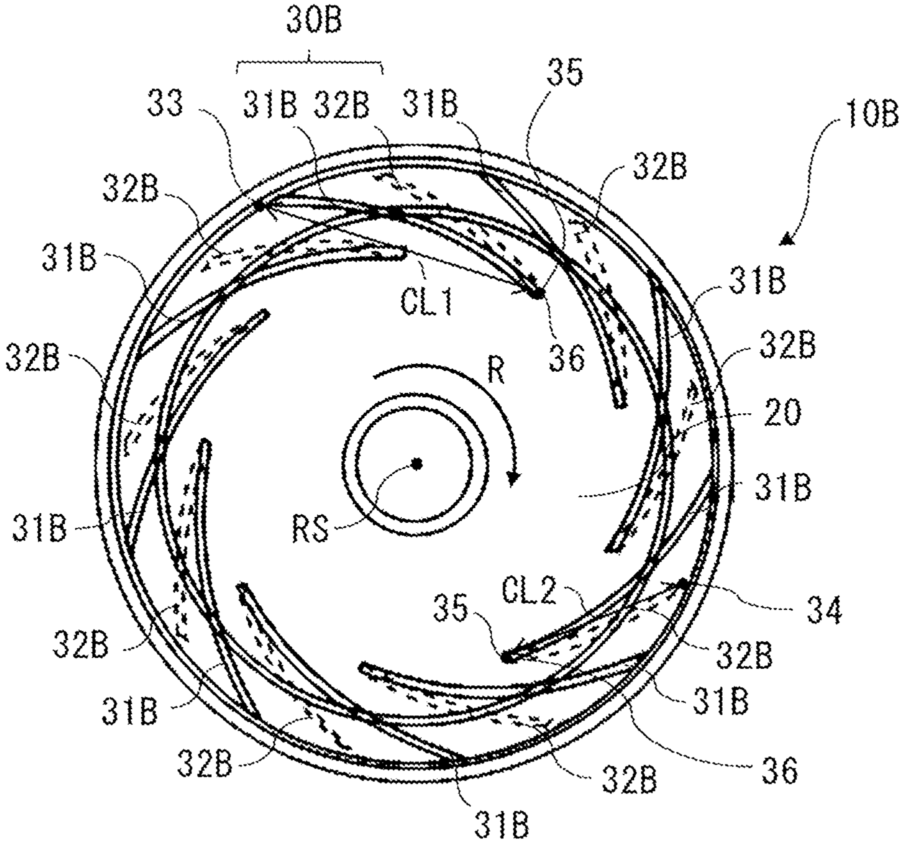
FIG. 9 is a conceptual diagram illustrating arrangement of first blade portions and second blade portions to a main plate in a turbo fan according to Embodiment 3 of the present disclosure.

FIG. 9 is a conceptual diagram illustrating arrangement of first blade portions 31B and second blade portions 32B to the main plate 20 in a turbo fan 10B according to Embodiment 3 of the present disclosure. Note that components having the same configuration as in the turbo fan 10 in FIG. 1 to FIG. 6 are denoted by the same reference numerals, and descriptions of the components are omitted. The turbo fan 10B according to Embodiment 3 is different from the turbo fan 10 according to Embodiment 1 in phases of the first blade portions 31B and the second blade portions 32B. Therefore, in the following description, configurations of blade portions 30B of the turbo fan 10B according to Embodiment 3 are mainly described with reference to FIG. 9.

(Blade Portion 30B)

When the main plate 20 rotates, the blade portions 30B rotate together with the main plate 20 and move in the circumferential direction of the main plate 20, thereby generating airflows directed from the center toward the outer periphery of the main plate 20. The plurality of blade portions 30B are arranged at predetermined intervals in the circumferential direction of the main plate 20. The plurality of blade portions 30B are circumferentially arranged around the rotary shaft RS, and base ends of the blade portions 30B are fixed to the main plate 20. The blade portions 30B include first blade portions 31B and second blade portions 32B. The first blade portions 31B are arranged on one of plate surfaces of the main plate 20, and the second blade portions 32B are arranged on the other plate surface of the main plate 20. In other words, the plurality of blade portions 30B are provided on both sides of the main plate 20 in the axial direction of the rotary shaft RS, and the first blade portions 31B and the second blade portions 32B are provided back to back with the main plate 20 in between. It is sufficient for the first blade portions 31B and the second blade portions 32B to be provided back to back with the main plate 20 in between. Therefore, among the blade portions 30B, the first blade portions 31B may be arranged on the upper part of the main plate 20 and the second blade portions 32B may be arranged on the lower part of the main plate 20, or the first blade portions 31B may be arranged on the lower part of the main plate 20 and the second blade portions 32B may be arranged on the upper part of the main plate 20. Each of the blade portions 30B may be formed such that the same cross-sectional shape of the blade continues in the axial direction of the rotary shaft RS, or may be a three-dimensional blade having a twisted shape.

FIG. 9 illustrates positional relationship of the main plate 20, the first blade portions 31B, and the second blade portions 32B as viewed in the axial direction of the rotary shaft RS. In the cross-section in the direction perpendicular to the rotary shaft RS, blade outer peripheral ends of the first blade portions 31B are referred to as the first outer peripheral end parts 33, and blade inner peripheral ends of the first blade portions 31B are referred to as the first inner peripheral end parts 35. In addition, a length of a straight line connecting the first outer peripheral end part 33 and the first inner peripheral end part 35 of each of the first blade portions 31B is defined as the first chord length CL1. Further, in the cross-section in the direction perpendicular to the rotary shaft RS, blade outer peripheral ends of the second blade portions 32B are referred to as the second outer peripheral end parts 34, and blade inner peripheral ends of the second blade portions 32B are referred to as the second inner peripheral end parts 36. In addition, a length of a straight line connecting the second outer peripheral end part 34 and the second inner peripheral end part 36 of each of the second blade portions 32B is defined as the second chord length CL2, Here, the first chord length CL1 and the second chord length CL2 positioned at the same distance from the main plate 20 in the axial direction of the rotary shaft RS are compared. At this time, it is assumed that the first outer peripheral end parts 33 and the second outer peripheral end parts 34 are positioned at the same distance from the main plate 20 in the axial direction of the rotary shaft RS, and the first inner peripheral end parts 35 and the second inner peripheral end parts 36 are positioned at the same distance from the main plate 20 in the axial direction of the rotary shaft RS. Note that, in the case where each of the blade portions 30B is the three-dimensional blade having the twisted shape, for example, the first chord length CL1 and the second chord length CL2 may be lengths at a position where each of the blade portions 30B and the main plate 20 are connected.

In the blade portions 30B, the chord length of each of the first blade portions 31B and the chord length of each of the second blade portions 32B are not equal to each other, and the first blade portions 31B and the second blade portions 32B are different in phase in the circumferential direction around the rotary shaft RS. More specifically, in the blade portions 30B, the first chord length CL1 of each of the first blade portions 31B and the second chord length CL2 of each of the second blade portions 32B at positions separated by the same distance from the main plate 20 in the axial direction of the rotary shaft RS of the main plate 20 are not equal to each other. Further, the first outer peripheral end parts 33 and the second outer peripheral end parts 34 of the blade portions 30B are disposed at different positions in the radial direction of the main plate 20 or are disposed at different positions in the circumferential direction of the main plate 20. Further, the first inner peripheral end parts 35 and the second inner peripheral end parts 36 of the blade portions 30B are disposed at the same position in the radial direction of the main plate 20 and are disposed at the same position in the circumferential direction of the main plate 20.

[Action and Effects of Turbo Fan 10B]

As described above, in the turbo fan 10B, the chord length of each of the first blade portions 31B arranged on the one plate surface of the main plate 20 and the chord length of each of the second blade portions 32B arranged on the other plate surface of the main plate 20 are not equal to each other. Therefore, in the turbo fan 10B, a speed difference occurs between the airflows passing through the first blade portions 31B and the airflows passing through the second blade portions 32B, and the phases of the airflows discharged from the respective blade portions 30B can be shifted from each other. As a result, the turbo fan 10B can suppress interference of the airflows discharged from the blade portions 30B, thereby reducing noise.

Further, the first outer peripheral end parts 33 and the second outer peripheral end parts 34 of the blade portions 30B are disposed at different positions in the radial direction of the main plate 20, or are disposed at different positions in the circumferential direction of the main plate 20. Therefore, in the turbo fan 10B the phases of the airflows passing through the first blade portions 31B and the phases of the airflows passing through the second blade portions 32B can be shifted from each other. As a result, the turbo fan 10B can suppress interference of the airflows discharged from the blade portions 30B, thereby reducing noise.

Embodiment 4

Figure 10:
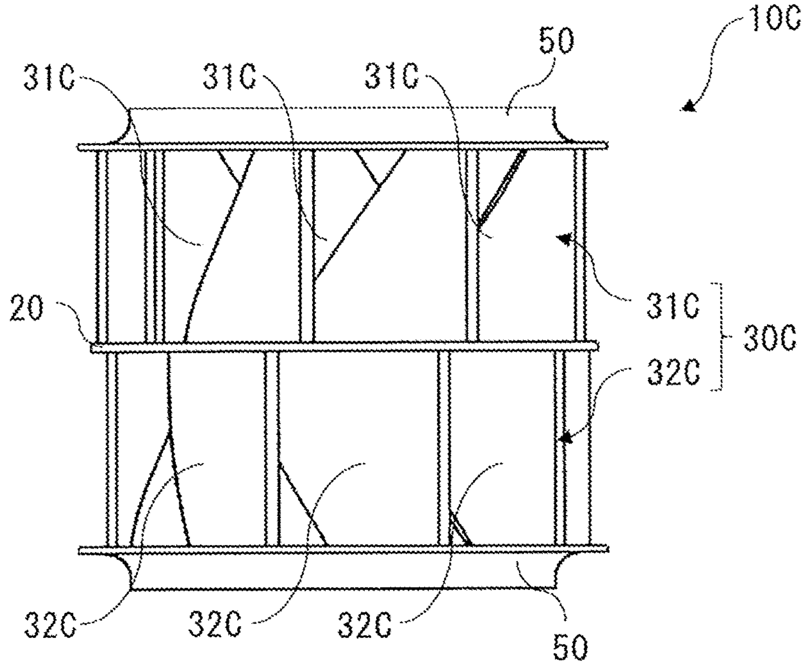
FIG. 10 is a side view of a turbo fan according to Embodiment 4 of the present disclosure.
Figure 11:
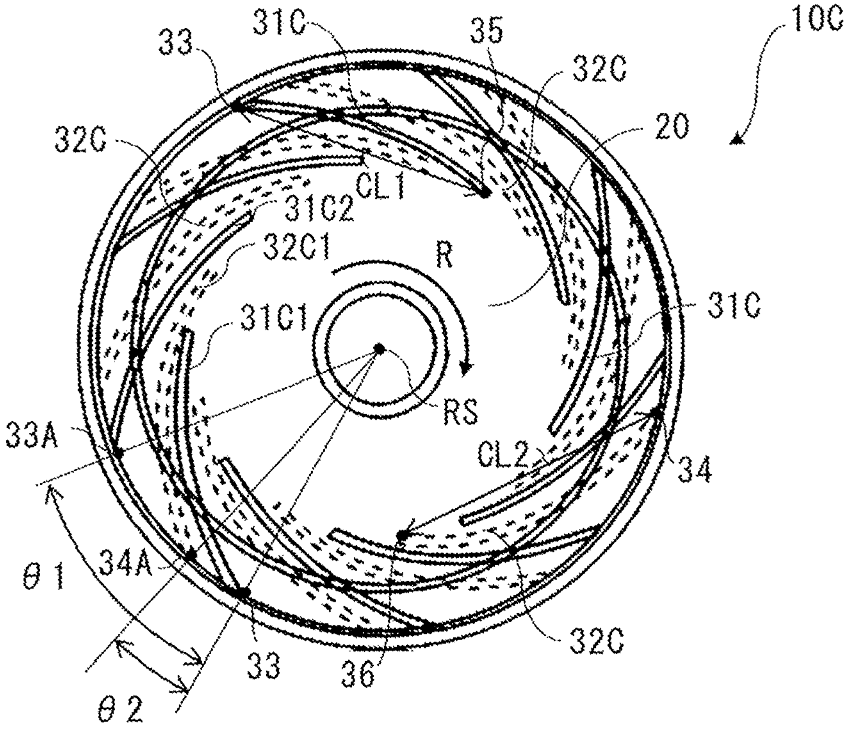
FIG. 11 is a conceptual diagram illustrating arrangement of first blade portions and second blade portions to a main plate in FIG. 10.

FIG. 10 is a side view of a turbo fan 10C according to Embodiment 4 of the present disclosure. FIG. 11 is a conceptual diagram illustrating arrangement of first blade portions 310 and second blade portions 320 to the main plate 20 of FIG. 10. Note that components having the same configuration as in the turbo fan 10 in FIG. 1 to FIG. 6 are denoted by the same reference numerals, and descriptions of the components are omitted. The turbo fan 10C according to Embodiment 4 is different from the turbo fan 10 according to Embodiment 1 in positions of first blade portions 31C and second blade portions 32C in the circumferential direction. The configuration of the turbo fan 10C other than the positions of the first blade portions 31C and the second blade portions 32C in the circumferential direction is similar to the configuration of the turbo fan 10 according to Embodiment 1. Therefore, in the following description, configurations of blade portions 30C of the turbo fan 10C according to Embodiment 4 are mainly described with reference to FIG. 10 and FIG. 11.

(Blade Portion 30C)

When the main plate 20 rotates, the blade portions 30C rotate together with the main plate 20 and move in the circumferential direction of the main plate 20, thereby generating airflows directed from the center toward the outer periphery of the main plate 20. The plurality of blade portions 30C are arranged at predetermined intervals in the circumferential direction of the main plate 20. The plurality of blade portions 30C are circumferentially arranged around the rotary shaft RS, and base ends of the blade portions 30C are fixed to the main plate 20. The blade portions 30C include first blade portions 31C and second blade portions 32C. The first blade portions 31C are arranged on one of plate surfaces of the main plate 20, and the second blade portions 32C are arranged on the other plate surface of the main plate 20. In other words, the plurality of blade portions 30C are provided on both sides of the main plate 20 in the axial direction of the rotary shaft RS, and the first blade portions 31C and the second blade portions 32C are provided back to back with the main plate 20 in between. In FIG. 10 and FIG. 11, the first blade portions 31C are arranged on the upper part of the main plate 20, and the second blade portions 32C are arranged on the lower part of the main plate 20. Alternatively, the first blade portions 31C may be arranged on the lower part of the main plate 20 and the second blade portions 320 may be arranged on the upper part of the main plate 20 as long as the first blade portions 31C and the second blade portions 32C are provided back to back with the main plate 20 in between. Each of the blade portions 30C may be formed such that the same cross-sectional shape of the blade continues in the axial direction of the rotary shaft RS, or may be a three-dimensional blade having a twisted shape.

FIG. 11 illustrates positional relationship of the main plate 20, the first blade portions 31C, and the second blade portions 32C as viewed in the axial direction of the rotary shaft RS. In the cross-section in the direction perpendicular to the rotary shaft RS, blade outer peripheral ends of the first blade portions 31C are referred to as the first outer peripheral end parts 33, and blade inner peripheral ends of the first blade portions 31C are referred to as the first inner peripheral end parts 35. In addition, a length of a straight line connecting the first outer peripheral end part 33 and the first inner peripheral end part 35 of each of the first blade portions 31C is defined as the first chord length CL1. Further, in the cross-section in the direction perpendicular to the rotary shaft RS, blade outer peripheral ends of the second blade portions 32C are referred to as the second outer peripheral end parts 34, and blade inner peripheral ends of the second blade portions 32C are referred to as the second inner peripheral end parts 36. In addition, a length of a straight line connecting the second outer peripheral end part 34 and the second inner peripheral end part 36 of each of the second blade portions 32C is defined as the second chord length CL2. Here, the first chord length CL1 and the second chord length CL2 positioned at the same distance from the main plate 20 in the axial direction of the rotary shaft RS are compared. At this time, it is assumed that the first outer peripheral end parts 33 and the second outer peripheral end parts 34 are positioned at the same distance from the main plate 20 in the axial direction of the rotary shaft RS, and the first inner peripheral end parts 35 and the second inner peripheral end parts 36 are positioned at the same distance from the main plate 20 in the axial direction of the rotary shaft RS. Note that, in the case where each of the blade portions 30C is the three-dimensional blade having the twisted shape, for example, the first chord length CL1 and the second chord length CL2 may be lengths at a position where each of the blade portions 30C and the main plate 20 are connected.

In the blade portions 30C, the chord length of each of the first blade portions 31C and the chord length of each of the second blade portions 32C are not equal to each other, and the first blade portions 31C and the second blade portions 32C are different in phase in the circumferential direction around the rotary shaft RS. More specifically, in the blade portions 30C, the first chord length CL2 of each of the first blade portions 31C and the second chord length CL2 of each of the second blade portions 32C at positions separated by the same distance from the main plate 20 in the axial direction of the rotary shaft RS of the main plate 20 are not equal to each other. Further, the first outer peripheral end parts 33 and the second outer peripheral end parts 34 of the blade portions 30C are disposed at the same position in the radial direction of the main plate 20 and are disposed at different positions in the circumferential direction of the main plate 20. Further, the first inner peripheral end parts 35 and the second inner peripheral end parts 36 of the blade portions 30C are disposed at different positions in the radial direction of the main plate 20 or are disposed at different positions in the circumferential direction of the main plate 20. The first chord length CL1 of each of the first blade portions 31C and the second chord length CL2 of each of the second blade portions 32C are not equal to each other, and the first outer peripheral end parts 33 of the first blade portions 31 and the second outer peripheral end parts 34 of the second blade portions 32 are different in phase in the circumferential direction around the rotary shaft RS and are coincident in distance in the radial direction around the rotary shaft RS.

The phase shift between the first blade portions 31C and the second blade portions 32C is described in more detail with reference to FIG. 11. An optional one of the plurality of first blade portions 31C is defined as a first reference blade portion 31C1. In the rotation direction R of the main plate 20, among the plurality of first blade portions 31C, the first blade portion 31C disposed adjacent to the first reference blade portion 31C1 in the circumferential direction is defined as a third blade portion 31C2. Further, when the rotary shaft RS is viewed in the axial direction, among the plurality of second blade portions 32C, the second blade portion 32C disposed at the position closest to the first reference blade portion 31C1 in the circumferential direction of the main plate 20 is defined as a fourth blade portion 32C1. Moreover, the first outer peripheral end part 33 of the third blade portion 31C2 is defined as a third outer peripheral end part 33A, and the second outer peripheral end part 34 of the fourth blade portion 32C1 is defined as a fourth outer peripheral end part 34A. An advancing angle between the first outer peripheral end part 33 of the first reference blade portion 31C1 and the third outer peripheral end part 33A of the third blade portion 31C2 is defined as an angle θ1, and an advancing angle between the first outer peripheral end part 33 of the first reference blade portion 31C1 and the fourth outer peripheral end part 34A of the fourth blade portion 32C1 is defined as an angle θ2. At this time, in the blade portions 30C, relationship of angle θ2≤(angle θ1)/2 is established. Note that the advancing angle is an angle in the circumferential direction of the main plate 20.

[Action and Effects of Turbo Fan 10C]

As described above, in the turbo fan 10C, the chord length of each of the first blade portions 31C arranged on the one plate surface of the main plate 20 and the chord length of each of the second blade portions 32C arranged on the other plate surface of the main plate 20 are not equal to each other. Therefore, in the turbo fan 10C, a speed difference occurs between the airflows passing through the first blade portions 31C and the airflows passing through the second blade portions 32C, and the phases of the airflows discharged from the respective blade portions 30C can be shifted from each other. As a result, the turbo fan 10C can suppress interference of the airflows discharged from the blade portions 30C, thereby reducing noise.

Further, the first inner peripheral end parts 35 and the second inner peripheral end parts 36 of the blade portions 30C are disposed at different positions in the radial direction of the main plate 20, or are disposed at different positions in the circumferential direction of the main plate 20. Therefore, in the turbo fan 10C, the speed difference occurs between the airflows passing through the first blade portions 31C and the airflows passing through the second blade portions 32C, and the phases of the airflows discharged from the respective blade portions 30C can be shifted from each other. As a result, the turbo fan 10C can suppress interference of the airflows discharged from the blade portions 30C, thereby reducing noise.

Further, the first outer peripheral end parts 33 and the second outer peripheral end parts 34 of the blade portions 30C are disposed at the same position in the radial direction of the main plate 20, and are disposed at different positions in the circumferential direction of the main plate 20. Therefore, in the turbo fan 10C, the phases of the airflows discharged from the first blade portions 31C and the phases of the airflows discharged from the second blade portions 32C can be shifted from each other. As a result, the turbo fan 10C can suppress interference of the airflows discharged from the blade portions 30C, thereby reducing noise.

Further, the first inner peripheral end parts 35 and the second inner peripheral end parts 36 of the blade portions 30C are disposed at different positions in the radial direction of the main plate 20, or are disposed at different positions in the circumferential direction of the main plate 20. In addition, the first outer peripheral end parts 33 and the second outer peripheral end parts 34 of the blade portions 30C are disposed at the same position in the radial direction of the main plate 20, and are disposed at different positions in the circumferential direction of the main plate 20. Since the phases of the first blade portions 31C and the phases of the second blade portions 32C of the blade portions 30C are shifted from each other through the main plate 20, the speed difference occurs between the airflows passing through the first blade portions 31C and the airflows passing through the second blade portions 32C, which makes it possible to shift the phases of the airflows discharged from the respective blade portions 30C. As a result, the turbo fan 10C can suppress interference of the airflows discharged from the blade portions 30C, thereby reducing noise.

Moreover, the blade portions 30C are provided such that the relationship of angle θ2≤(angle θ1)/2 is established. Since the advancing angle between each of the first blade portions 31C and the corresponding second blade portion 32C is small in the turbo fan 10C, the first blade portions 31C and the second blade portions 32C can be easily demolded at the same time. Accordingly, the turbo fan 10C enables reduction in molding cost in manufacturing of the turbo fan 10C.

Embodiment 5

Figure 12:
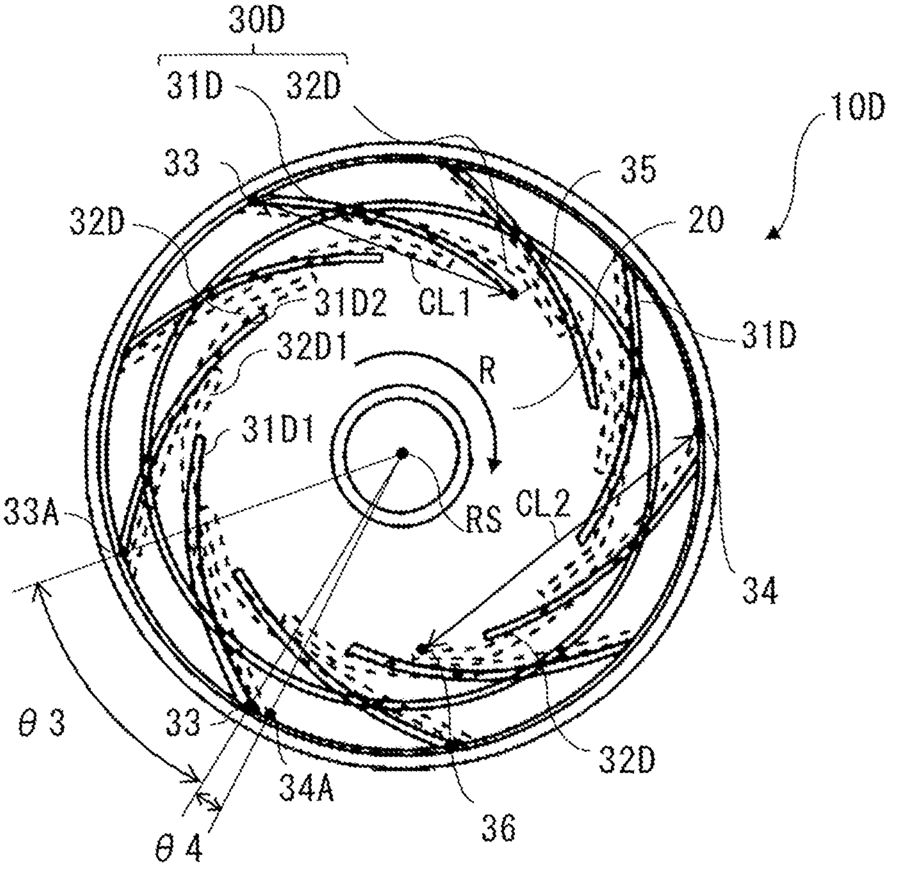
FIG. 12 is a conceptual diagram illustrating positional relationship of a main plate, first blade portions, and second blade portions of a turbo fan according to Embodiment 5 of the present disclosure, as viewed in an axial direction of a rotary shaft.

FIG. 12 is a conceptual diagram illustrating positional relationship of the main plate 20, first blade portions 31D, and second blade portions 32D of a turbo fan according to Embodiment 5 of the present disclosure as viewed in the axial direction of the rotary shaft RS. Note that components having the same configuration as in any of the turbo fan 10, the turbo fan 10A, the turbo fan 10B, and the turbo fan 10C in FIG. 1 to FIG. 11 are denoted by the same reference numerals, and descriptions of the components are omitted. A turbo fan 10D according to Embodiment 5 is different from the turbo fan 10C according to Embodiment 4 in positions of first blade portions 31C and the second blade portions 32D in the circumferential direction. The configuration of the turbo fan 10D other than the positions of the first blade portions 31D and the second blade portions 32D in the circumferential direction is similar to the configuration of the turbo fan 10C according to Embodiment 4. Therefore, in the following description, the configurations of blade portions 30D of the turbo fan 10D according to Embodiment 5 are mainly described with reference to FIG. 12.

(Blade Portion 30D)

When the main plate 20 rotates, the blade portions 30D rotate together with the main plate 20 and move in the circumferential direction of the main plate 20, thereby generating airflows directed from the center toward the outer periphery of the main plate 20. The plurality of blade portions 30D are arranged at predetermined intervals in the circumferential direction of the main plate 20. The plurality of blade portions 30D are circumferentially arranged around the rotary shaft RS, and base ends of the blade portions 30D are fixed to the main plate 20. The blade portions 30D include first blade portions 31D and second blade portions 32D. The first blade portions 31D are arranged on one of plate surfaces of the main plate 20, and the second blade portions 32D are arranged on the other plate surface of the main plate 20. In other words, the plurality of blade portions 30D are provided on both sides of the main plate 20 in the axial direction of the rotary shaft RS, and the first blade portions 31D and the second blade portions 32D are provided back to back with the main plate 20 in between. In FIG. 12, the first blade portions 31D are arranged on the upper part of the main plate 20, and the second blade portions 32D are arranged on the lower part of the main plate 20. Alternatively, the first blade portions 31D may be arranged on the lower part of the main plate 20 and the second blade portions 32D may be arranged on the upper part of the main plate 20 as long as the first blade portions 31D and the second blade portions 32D are provided back to back with the main plate 20 in between. Each of the blade portions 30D may be formed such that the same cross-sectional shape of the blade continues in the axial direction of the rotary shaft RS, or may be a three-dimensional blade having a twisted shape.

In the cross-section in the direction perpendicular to the rotary shaft RS, blade outer peripheral ends of the first blade portions 310 are referred to as the first outer peripheral end parts 33, and blade inner peripheral ends of the first blade portions 31D are referred to as the first inner peripheral end parts 35. In addition, a length of a straight line connecting the first outer peripheral end part 33 and the first inner peripheral end part 35 of each of the first blade portions 31D is defined as the first chord length CL1. Further, in the cross-section in the direction perpendicular to the rotary shaft RS, blade outer peripheral ends of the second blade portions 32D are referred to as the second outer peripheral end parts 34, and blade inner peripheral ends of the second blade portions 32D are referred to as the second inner peripheral end parts 36. In addition, a length of a straight line connecting the second outer peripheral end part 34 and the second inner peripheral end part 36 of each of the second blade portions 32D is defined as the second chord length CL2. Here, the first chord length CL1 and the second chord length CL2 positioned at the same distance from the main plate 20 in the axial direction of the rotary shaft RS are compared. At this time, it is assumed that the first outer peripheral end parts 33 and the second outer peripheral end parts 34 are positioned at the same distance from the main plate 20 in the axial direction of the rotary shaft RS, and the first inner peripheral end parts 35 and the second inner peripheral end parts 36 are positioned at the same distance from the main plate 20 in the axial direction of the rotary shaft RS. Note that, in the case where each of the blade portions 30D is the three-dimensional blade having the twisted shape, for example, the first chord length CL1 and the second chord length CL2 may be lengths at a position where each of the blade portions 30D and the main plate 20 are connected, In the blade portions 30D, the chord length of each of the first blade portions 31D and the chord length of each of the second blade portions 32D are not equal to each other, and the first blade portions 31D and the second blade portions 32D are different in phase in the circumferential direction around the rotary shaft RS. More specifically, in the blade portions 30D, the first chord length CL1 of each of the first blade portions 31D and the second chord length CL2 of each of the second blade portion 32D are not equal to each other. Further, the first outer peripheral end parts 33 and the second outer peripheral end parts 34 of the blade portions 30D are disposed at the same position in the radial direction of the main plate 20 and are disposed at different positions in the circumferential direction of the main plate 20. Furthermore, the first inner peripheral end parts 35 and the second inner peripheral end parts 36 of the blade portions 30D are not disposed at the same position in at least one of the radial direction and the circumferential direction of the main plate 20, The first chord length CL1 of each of the first blade portions 31D and the second chord length CL2 of each of the second blade portions 32D are not equal to each other, and the first outer peripheral end parts 33 of the first blade portions 31D and the second outer peripheral end parts 34 of the second blade portions 32D are different in phase in the circumferential direction around the rotary shaft RS and are coincident in distance in the radial direction around the rotary shaft RS.

The phase shift between the first blade portions 31D and the second blade portions 32D is described in more detail with reference to FIG. 12. An optional one of the plurality of first blade portions 31D is defined as a first reference blade portion 31D1. In the rotation direction R of the main plate 20, among the plurality of first blade portions 31D, the first blade portion 31D disposed adjacent to the first reference blade portion 31D1 in the circumferential direction is defined as a third blade portion 31D2. Further, when the rotary shaft RS is viewed in the axial direction, among the plurality of second blade portions 32D, the second blade portion 32D disposed at the position closest to the first reference blade portion 31D1 in the circumferential direction of the main plate 20 is defined as a fourth blade portion 32D1. Moreover, the first outer peripheral end part 33 of the third blade portion 31D2 is defined as the third outer peripheral end part 33A, and the second outer peripheral end part 34 of the fourth blade portion 32D1 is defined as the fourth outer peripheral end part 34A. An advancing angle between the first outer peripheral end part 33 of the first reference blade portion 31D1 and the third outer peripheral end part 33A of the third blade portion 31D2 is defined as an angle 83, and an advancing angle between the first outer peripheral end part 33 of the first reference blade portion 31D1 and the fourth outer peripheral end part 34A of the fourth blade portion 32D1 is defined as an angle 84. At this time, in the blade portions 30D, relationship of angle θ4≤± (angle θ3)/2 is established. Further, when the rotary shaft RS is viewed in the axial direction, the blade portions 30D are provided to have positional relationship in which the first reference blade portion 31D1 and the fourth blade portion 3201 intersect with each other with the main plate 20 in between.

[Action and Effects of Turbo Fan 10D]

As described above, in the turbo fan 10D, the chord length of each of the first blade portions 31D arranged on the one plate surface of the main plate 20 and the chord length of each of the second blade portions 32D arranged on the other plate surface of the main plate 20 are not equal to each other. Therefore, in the turbo fan 10D, a speed difference occurs between the airflows passing through the first blade portions 31D and the airflows passing through the second blade portions 320, and the phases of the airflows discharged from the respective blade portions 30D can be shifted from each other. As a result, the turbo fan 10D can suppress interference of the airflows discharged from the blade portions 30D, thereby reducing noise.

Further, the first inner peripheral end parts 35 and the second inner peripheral end parts 36 of the blade portions 30D are disposed at different positions in the radial direction of the main plate 20, or are disposed at different positions in the circumferential direction of the main plate 20. Therefore, in the turbo fan 10D, the speed difference occurs between the airflows passing through the first blade portions 31D and the airflows passing through the second blade portions 32D, and the phases of the airflows discharged from the respective blade portions 30D can be shifted from each other. As a result, the turbo fan 10D can suppress interference of the airflows discharged from the blade portions 30D, thereby reducing noise.

Further, the first outer peripheral end parts 33 and the second outer peripheral end parts 34 of the blade portions 30D are disposed at the same position in the radial direction of the main plate 20, and are disposed at different positions in the circumferential direction of the main plate 20. Therefore, in the turbo fan 10D, the phases of the airflows discharged from the first blade portions 31D and the phases of the airflows discharged from the second blade portions 32D can be shifted from each other. As a result, the turbo fan 10D can suppress interference of the airflows discharged from the blade portions 30D, thereby reducing noise.

Further, the first inner peripheral end parts 35 and the second inner peripheral end parts 36 of the blade portions 30D are disposed at different positions in the radial direction of the main plate 20, or are disposed at different positions in the circumferential direction of the main plate 20. In addition, the first outer peripheral end parts 33 and the second outer peripheral end parts 34 of the blade portions 30D are disposed at the same position in the radial direction of the main plate 20, and are disposed at different positions in the circumferential direction of the main plate 20. Since the phases of the first blade portions 31D and the phases of the second blade portions 32D of the blade portions 30D are shifted from each other through the main plate 20, the speed difference occurs between the airflows passing through the first blade portions 31D and the airflows passing through the second blade portions 32D, which makes it possible to shift the phases of the airflows discharged from the respective blade portions 30D. As a result, the turbo fan 10D can suppress interference of the airflows discharged from the blade portions 30D, thereby reducing noise.

Moreover, when the rotary shaft RS is viewed in the axial direction, the blade portions 30D are provided such that the first blade portion 31C and the fourth blade portion 32D1 intersect with each other with the main plate 20 in between. Therefore, in the turbo fan 10D, the speed difference occurs between the airflows passing through the first blade portions 31D and the airflows passing through the second blade portions 32D, and the phases of the airflows discharged from the respective blade portions 30D can be shifted from each other. As a result, the turbo fan 10D can suppress interference of the airflows discharged from the blade portions 30D, thereby reducing noise.

Moreover, the blade portions 30D are provided such that the relationship of angle θ4≤±(angle θ3)/2 is established. Since the advancing angle between each of the first blade portions 31D and the corresponding second blade portion 32D is small in the turbo fan 10D, the first blade portions 31D and the second blade portions 32D can be easily demolded at the same time. Accordingly, the turbo fan 10D enables reduction in molding cost in manufacturing of the turbo fan 10D.

Embodiment 6

Figure 13:
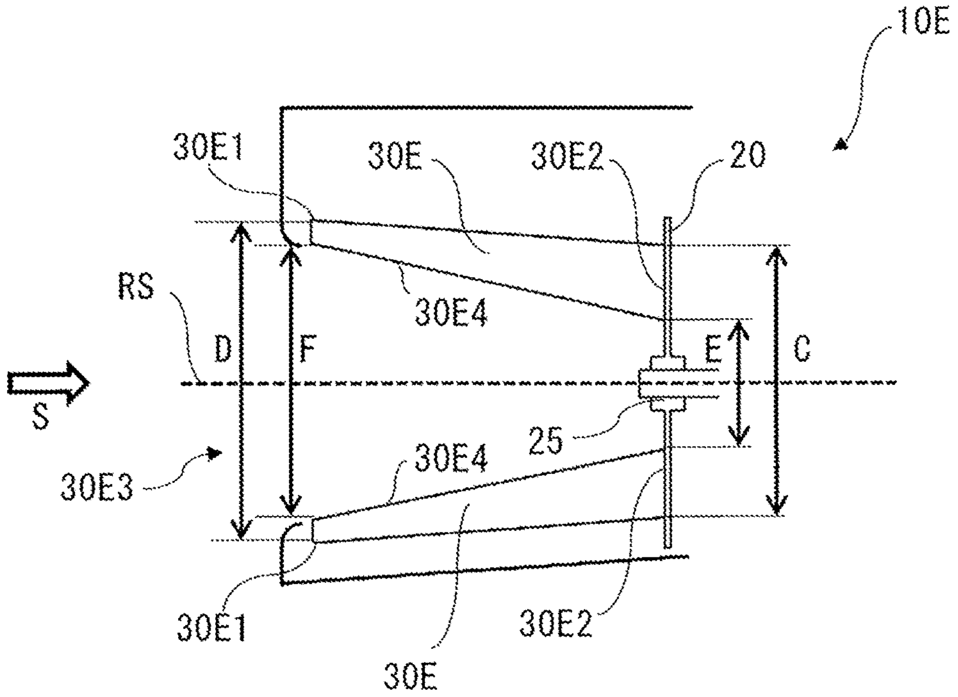
FIG. 13 is a schematic cross-sectional view of a turbo fan according to Embodiment 6 of the present disclosure.

FIG. 13 is a schematic cross-sectional view of a turbo fan 10E according to Embodiment 6 of the present disclosure. FIG. 13 is an enlarged view of blade portions 30 disposed on one of the plate surfaces of the main plate 20. Note that components having the same configuration as in any of the turbo fan 10, the turbo fan 10A, the turbo fan 10B, the turbo fan 10C, and the turbo fan 10D in FIG. 1 to FIG. 12 are denoted by the same reference numerals, and descriptions of the components are omitted. The turbo fan 10E according to Embodiment 6 is obtained by further specifying the entire shapes of any of the blade portions 30, the blade portions 30A, the blade portions 30B, the blade portions 30C, and the blade portions 30D. Therefore, each of the blade portions 30E has the configuration of any one of the blade portion 30, the blade portion 30A, the blade portion 30B, the blade portion 30C, and the blade portion 30D described above. In the following description, the configurations of the blade portions 30E of the turbo fan 10E according to Embodiment 6 are mainly described with reference to FIG. 13. Note that the blade portions 30E may be the above-described first blade portions 31 or the above-described second blade portions 32.

(Blade Portion 30E)

As illustrated in FIG. 13, each of the blade portions 30E includes, in the axial direction of the rotary shaft RS, a front end part 30E1 and a base part 30E2 that is an end part on a side opposite to the front end part 30E1 and is connected to the main plate 20. The blade portions 30E form an air inlet 30E3 among the front end parts 30E1 of the plurality of blade portions 30. In a case where a blade outer diameter of the base parts 30E2 is defined as a first blade outer diameter C and a blade outer diameter of the front end parts 30E1 is defined as a second blade outer diameter D, the blade portions 30E have relationship of second blade outer diameter D>first blade outer diameter C. Further, in the axial direction of the rotary shaft RS, each of the blade portions 30E has an inclined part 30E4 from the front end part 30E1 to the base part 30E2 on an inner periphery thereof. In other words, in a case where a blade inner diameter of the base parts 30E2 is defined as a first blade inner diameter E and a blade inner diameter of the front end parts 30E1 is defined as a second blade inner diameter F, the blade portions 30E have relationship of second blade inner diameter F>first blade inner diameter E. Since each of the blade portions 30 has the inclined part 30E4 on the inner periphery thereof, each of the blade portions 30 has a tapered shape from the base part 30E2 toward the front end part 30E1 in a vertical cross-section of the main plate 20.

Figure 14:
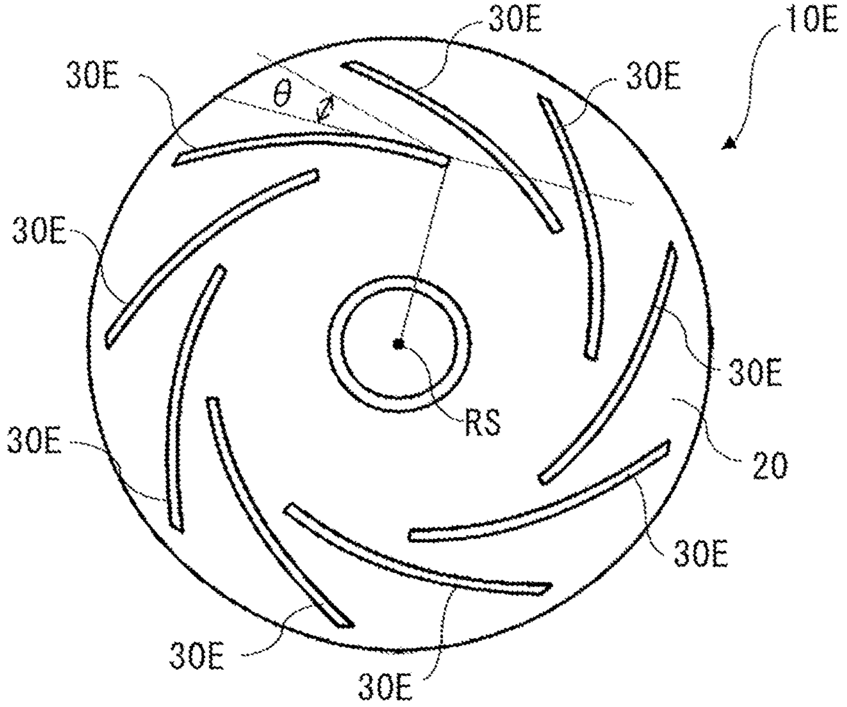
FIG. 14 is a plan view of the turbo fan in an axial direction of a rotary shaft as viewed from an arrow S in FIG. 13.

FIG. 14 is a plan view in the axial direction of the rotary shaft RS of the turbo fan 10E as viewed from an arrow S in FIG. 13. As illustrated in FIG. 14, each of the blade portions 30E further has relationship of blade inlet angle θ≤90 degrees.

[Action and Effects of Turbo Fan 10E]

As described above, since the blade portions 30E have the relationship of second blade outer diameter D>first blade outer diameter C, it is possible to uniformize a blowout wind velocity of the air in the axial direction of the rotary shaft RS.

Further, since the blade portions 30E have the relationship of second blade inner diameter F>first blade inner diameter E, each of the blade portions 30E has the inclined part 30E4 from the front end part 30E1 to the base part 30E2 on the inner periphery thereof in the axial direction of the rotary shaft RS. In addition, each of the blade portions 30E has the relationship of blade inlet angle θ≤90 degrees. With the above-described configurations, the blade portions 30E can reduce separation of the airflows from the blades when the air is suctioned, thereby reducing noise.

Embodiment 7

Figure 15:
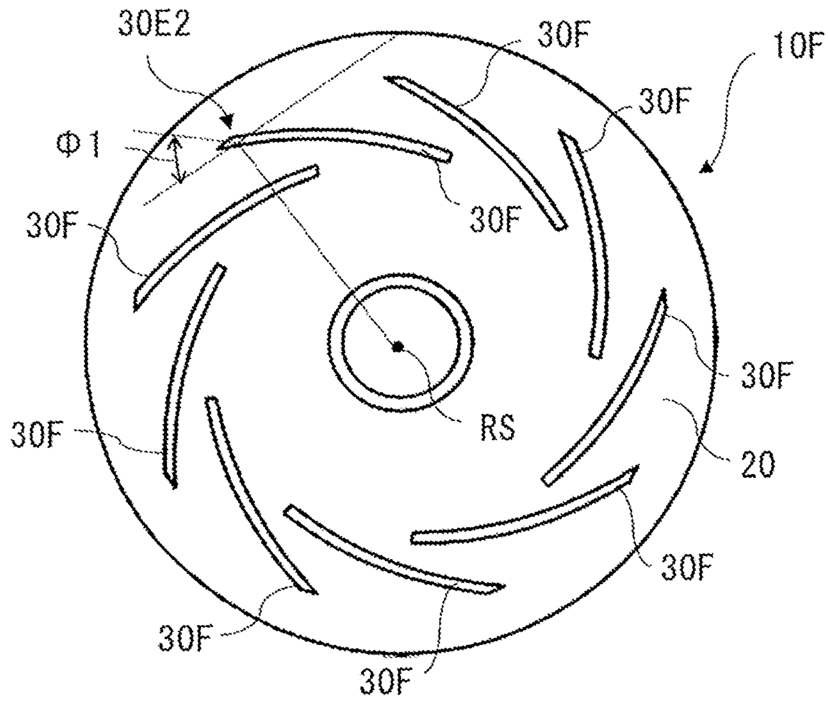
FIG. 15 is a conceptual diagram illustrating a blade outlet angle at a base part of a blade portion of a turbo fan according to Embodiment 7 of the present disclosure.
Figure 16:
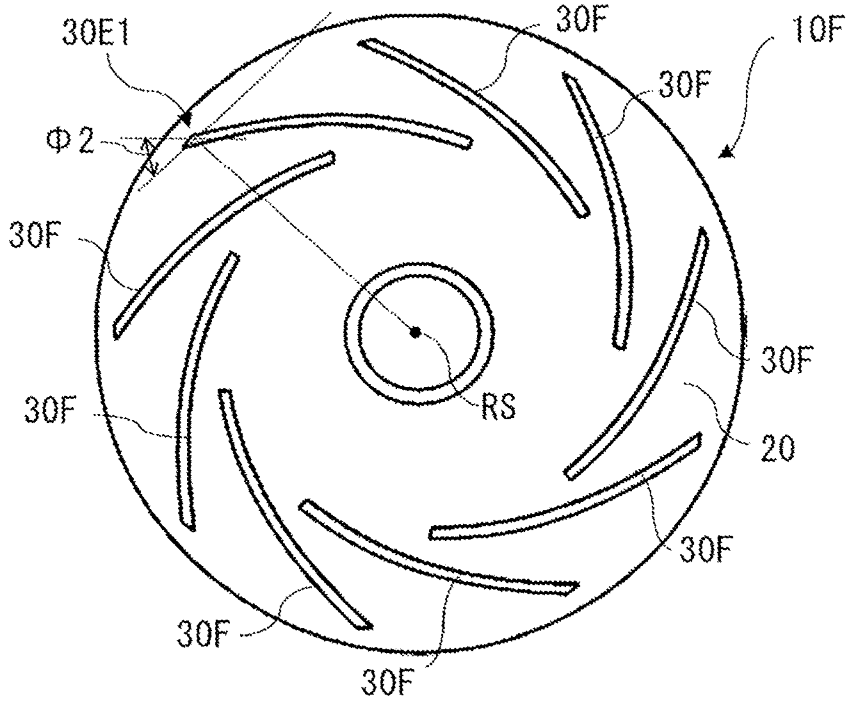
FIG. 16 is a conceptual diagram illustrating a blade outlet angle at a front end part of the blade portion of the turbo fan according to Embodiment 7 of the present disclosure.

FIG. 15 is a conceptual diagram illustrating a blade outlet angle Φ1 at the base part 30E2 of each of blade portions 30F of a turbo fan 10F according to Embodiment 7 of the present disclosure. FIG. 16 is a conceptual diagram illustrating a blade outlet angle Φ2 at the front end part 30E1 of each of the blade portions 30F of the turbo fan 10F according to Embodiment 7 of the present disclosure. Note that components having the same configuration as in any of the turbo fan 10, the turbo fan 10A, the turbo fan 10B, the turbo fan 10C, the turbo fan 10D, and the turbo fan 10E in FIG. 1 to FIG. 14 are denoted by the same reference numerals, and descriptions of the components are omitted. The turbo fan 10F according to Embodiment 7 is obtained by further specifying the entire shapes of any of the blade portions 30, the blade portions 30A, the blade portions 30B, the blade portions 30C, the blade portions 30D, and the blade portions 30E. Therefore, each of the blade portions 30F has the configurations of any of the blade portion 30, the blade portion 30A, the blade portion 30B, the blade portion 30C, the blade portion 30D, and the blade portion 30E described above. In the following description, the configurations of the blade portions 30F of the turbo fan 10F according to Embodiment 7 are mainly described with reference to FIG. 15 and FIG. 16. Note that the blade portions 30F may be the above-described first blade portions 31 or the above-described second blade portions 32.

A blade outlet angle at the base part 30E2 of each of the blade portions 30F is defined as the blade outlet angle Φ1. In addition, a blade outlet angle at the front end part 30E1 of each of the blade portions 30F is defined as the blade outlet angle Φ2. In the turbo fan 10F, each of the blade portions 30F has relationship of blade outlet angle Φ1≥blade outlet angle Φ2.

[Action and Effects of Turbo Fan 10F]

As described above, since each of the blade portions 30F of the turbo fan 10F has the relationship of blade outlet angle Φ1≥blade outlet angle Φ2, it is possible to increase the wind velocity on the main plate side on which the outer peripheral diameter is small, to increase PQ characteristics, and to suppress ventilation resistance. This makes it possible to improve efficiency.

Embodiment 8

Figure 17:
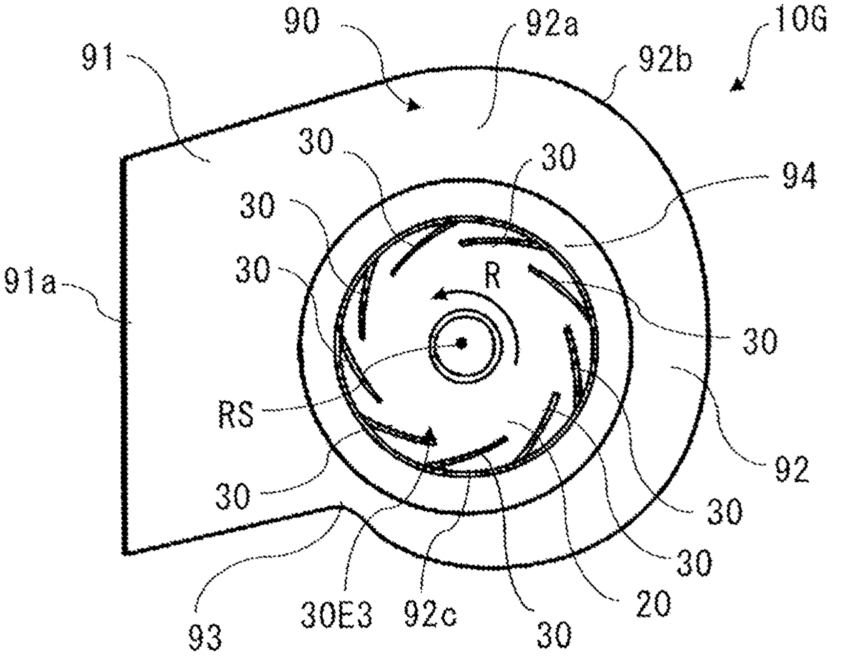
FIG. 17 is a schematic side view of a turbo fan according to Embodiment 8 of the present disclosure.
Figure 18:
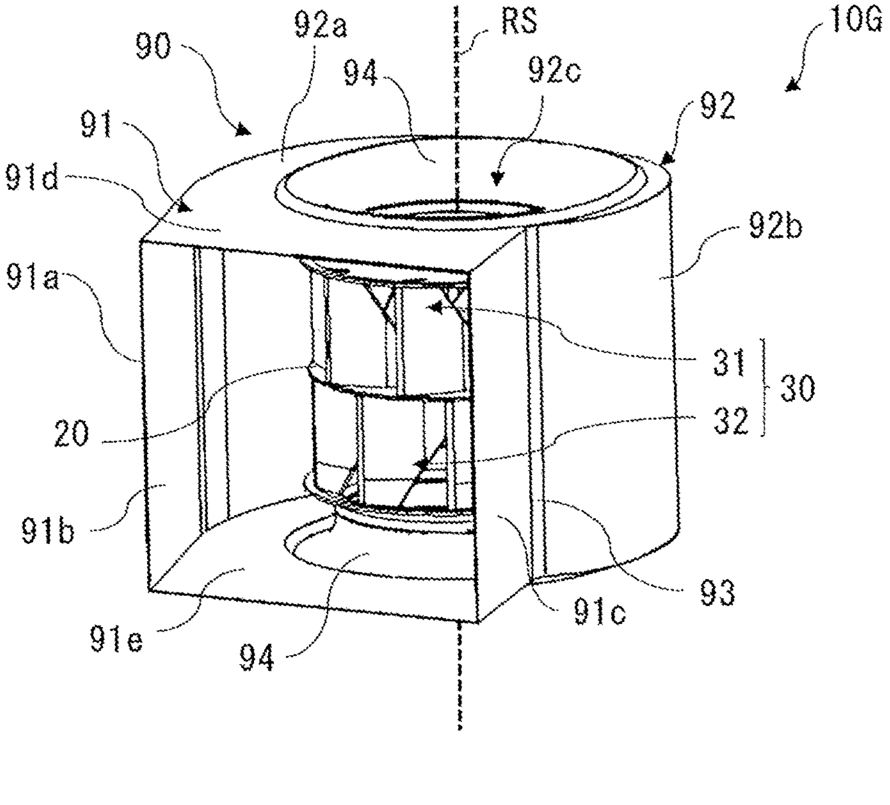
FIG. 18 is a perspective view of the turbo fan according to Embodiment 8 of the present disclosure.
Figure 19:
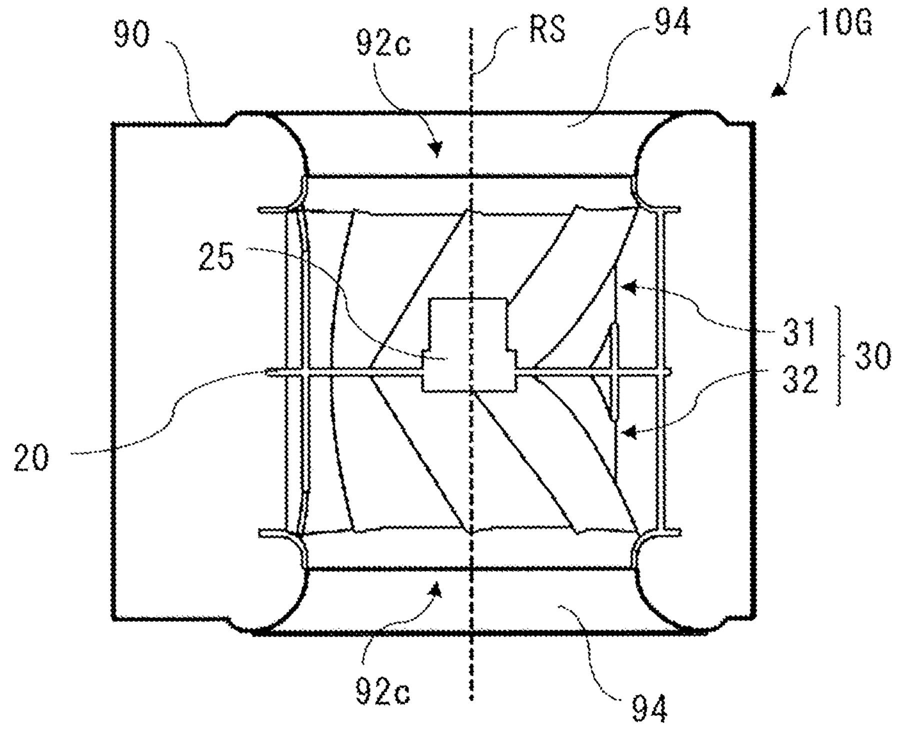
FIG. 19 is a schematic cross-sectional view of the turbo fan according to Embodiment 8 of the present disclosure.

FIG. 17 is a schematic side view of a turbo fan 10G according to Embodiment 8 of the present disclosure. FIG. 18 is a perspective view of the turbo fan 10G according to Embodiment 8 of the present disclosure. FIG. 19 is a schematic cross-sectional view of the turbo fan 10G according to Embodiment 8 of the present disclosure. Note that components having the same configuration as in any of the turbo fan 10, the turbo fan 10A, the turbo fan 10B, the turbo fan 10C, the turbo fan 10D, the turbo fan 10E, and the turbo fan 10F in FIG. 1 to FIG. 16 are denoted by the same reference numerals, and descriptions of the components are omitted. The turbo fan 10G further includes a casing 90. The turbo fan 10G have the configuration same as the configuration of any of the turbo fan 10, the turbo fan 10C, the turbo fan 10D, the turbo fan 10E, and the turbo fan 10F except that the turbo fan 10G has the casing 90. The turbo fan 10G has one main plate 20, and the blade portions 30 are provided on both surfaces of the main plate 20 made of one plate material. Further, the boss portion 25 is provided at a center part of the main plate 20. The turbo fan 10G has the casing 90 of a double suction type in which a side wall 92*a* having an air inlet 92*c* is provided on each side of the main plate 20 in the axial direction of the rotary shaft RS.

(Casing 90)

The casing 90 houses the main plate 20 and the blade portions 30, and includes the air inlets 92*c* from which the air to be suctioned into the blade portions 30 is taken in and an air outlet 91*a* from which the air sent by the blade portions 30 is discharged. The casing 90 surrounds the blade portions 30, and straightens the air blown out from the blade portions 30. The casing 90 includes a discharge portion 91 and a scrod portion 92. The discharge portion 91 forms the air outlet 91*a* from which the airflows generated by the blade portions 30 and passing through the scroll portion 92 is discharged. The scroll portion 92 forms an air passage that converts dynamic pressure of the airflows generated by the blade portions 30 into static pressure. The scroll portion 92 includes the side walls 92*a* that cover the blade portions 30 from the axial direction of the rotary shaft RS of the turbo fan 10 and each have the air inlet 92*c* from which the air is taken in, and a peripheral wall 92*b* that surrounds the blade portions 30 from the radial direction of the rotary shaft RS. The scroll portion 92 further includes a tongue portion 93 that guides the airflows generated by the blade portions 30 to the air outlet 91*a* through the scroll portion 92. The radial direction of the rotary shaft RS is a direction perpendicular to the rotary shaft RS. An internal space of the scroll portion 92 configured by the peripheral wall 92*b* and the side walls 92*a* is a space through which the air blown out from the blade portions 30 flows along the peripheral wall 92*b*.

(Side Wall 92*a*)

In the turbo fan 10G, the casing 90 has the two side walls 92*a* that are disposed to face each other. The side walls 92*a* are disposed perpendicularly to the axial direction of the rotary shaft RS of the blade portions 30, to cover at least a part of the blade portions 30. The side walls 92*a* of the casing 90 each have the air inlet 92*c* that enables the air to flow between the blade portions 30 and an outside of the casing 90. Further, the side walls 92*a* each include a bell mouth 94 that guides the airflow suctioned into the casing 90 through the air inlet 92*c*. The bell mouths 94 are provided at positions facing the air inlets 30E3 of the blade portions 30. Each of the bell mouths 94 has a cylindrical shape, and is formed such that the air passage is narrowed from an upstream side to a downstream side of the airflow suctioned into the casing 90 through the air inlet 92*c*. The air inlets 92*c* each have a circular shape, and are formed such that centers of the respective air inlets 92*c* are coincident with the center of the rotary shaft RS of the blade portions 30. The configurations of the side walls 92*a* cause the air near the air inlets 92*c* to smoothly flow and to efficiently flow into the blade portions 30 from the air inlets 92*c*.

(Peripheral Wall 92*b*)

The peripheral wall 92*b* surrounds the blade portions 30 from the radial direction of the rotary shaft RS, and has an inner peripheral surface opposite to the outer peripheral side of the blade portions 30 in the radial direction. As illustrated in FIG. 17, the peripheral wall 92*b* has a spiral shape in which a distance from the rotary shaft RS is gradually increased at a predetermined expansion ratio in the rotation direction R of the main plate 29. In other words, a gap between the peripheral wall 92*b* and the outer periphery of the blade portions 30 is expanded at the predetermined ratio from the tongue portion 93 toward the discharge portion 91, and a flow path area of the air is also gradually increased. Examples of the spiral shape formed at the predetermined expansion ratio include a logarithmic spiral shape, an Archimedes spiral shape, and a spiral shape based on an involute curve. With such a configuration, the air sent from the blade portions 30 smoothly flows in the gap between the blade portions 30 and the peripheral wall 92*b*. Accordingly, the static pressure of the air is efficiently increased from the tongue portion 93 toward the discharge portion 91 inside the casing 90.

(Discharge Portion 91)

The discharge portion 91 is made of a hollow pipe that has a rectangular cross-section orthogonal to the flow direction of the air flowing along the peripheral wall 92*b*. The discharge portion 91 forms a flow path that guides and discharges the air sent from the blade portions 30 and flowing in the gap between the peripheral wall 92*b* and the blade portions 30, to the outside. The discharge portion 91 forms the air outlet 91*a* from which the air flowing through the flow path inside the discharge portion 91 is discharged to the outside.

As illustrated in FIG. 18, the discharge portion 91 includes an extension plate 91*b*, a diffuser plate 91*c*, a first side plate 91*d*, a second side plate 91*e*, and the like. The extension plate 91*b* is smoothly continuous to and is integral with a spiral end part of the peripheral wall 92*b* on the downstream side. The diffuser plate 91*c* is continuous to the tongue portion 93, and faces the extension plate 91*b* at a predetermined angle such that a cross-sectional area of the flow path is gradually increased along the flow direction of the air inside the discharge portion 91. The first side plate 91*d* is connected to one of the side walls 92*a*, and the second side plate 91*e* is connected to the other side wall 92*a*. Further, the first side plate 91*d* and the second side plate 91*e* facing each other are connected by the extension plate 91*b* and the diffuser plate 91*c*. As described above, the discharge portion 91 has the flow path with the rectangular cross-section formed by the extension plate 91*b*, the diffuser plate 91*c*, the first side plate 91*d*, and the second side plate 91*e*.

Figure 20:
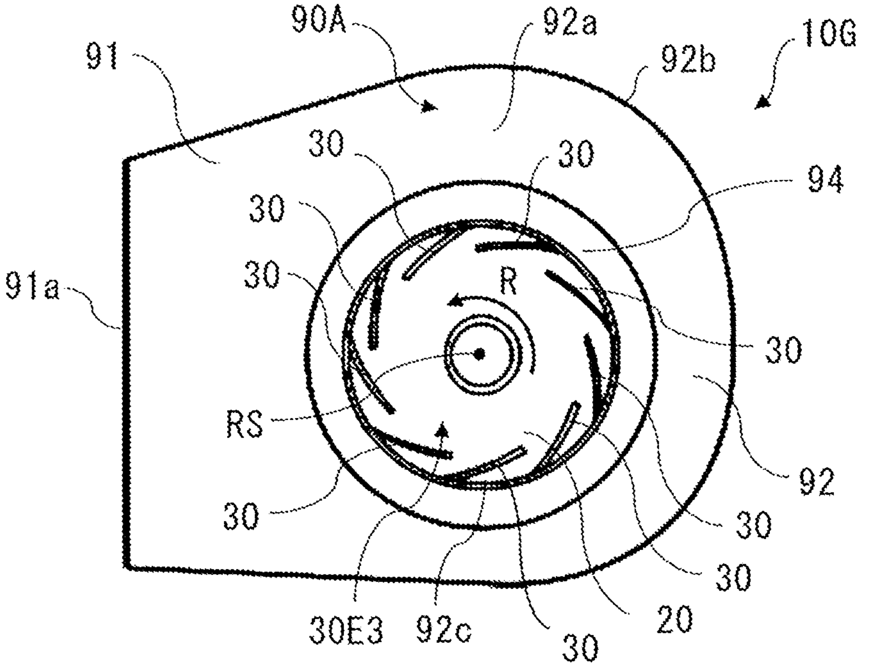
FIG. 20 is a schematic side view of a modification of the turbo fan according to Embodiment 8 of the present disclosure.

FIG. 20 is a schematic side view of a modification of the turbo fan 10G according to Embodiment 8 of the present disclosure. The turbo fan 10G includes a casing 90A of a double suction type in which the side wall 92*a* having the air inlet 92*c* is provided on each side of the main plate 20 in the axial direction of the rotary shaft RS. Unlike the casing 90, the casing 90A is a casing having no tongue portion 93. The turbo fan 10G may include the casing 90A having no tongue portion 93 as long as the turbo fan 10G includes the air inlets 92*c* and the air outlet 91*a*.

[Operation of Turbo Fan 10G]

When the blade portions 30 rotate together with the main plate 20, air outside the casing 90 is suctioned into the casing 90 through the air inlets 92*c*. The air suctioned into the casing 90 is guided by the bell mouths 94 and suctioned into the blade portions 30. The air suctioned into the blade portions 30 becomes airflows with dynamic pressure and static pressure in the course of passing through spaces among the plurality of blade portions 30, and the airflows are then blown out outward in the radial direction of the blade portions 30. The dynamic pressure of the airflows blown out from the blade portions 30 is converted into the static pressure while the airflows are guided between the inside of the peripheral wall 92*b* and the blade portions 30 of the scroll portion 92. Thereafter, the airflows blown out from the blade portions 30 pass through the scroll portion 92, and are then blown out to the outside of the casing 90 from the air outlet 91*a* provided at the discharge portion 91.

[Action and Effects of Turbo Fan 10G]

As described above, since the turbo fan 10G includes the casing 90 or the casing 90A, it is possible to convert the dynamic pressure of the airflows generated by the blade portions 30 into the static pressure. Further, since the turbo fan 10G includes the casing 90 or the casing 90A, it is possible to specify the blowout direction of the air.

Embodiment 9

Figure 21:
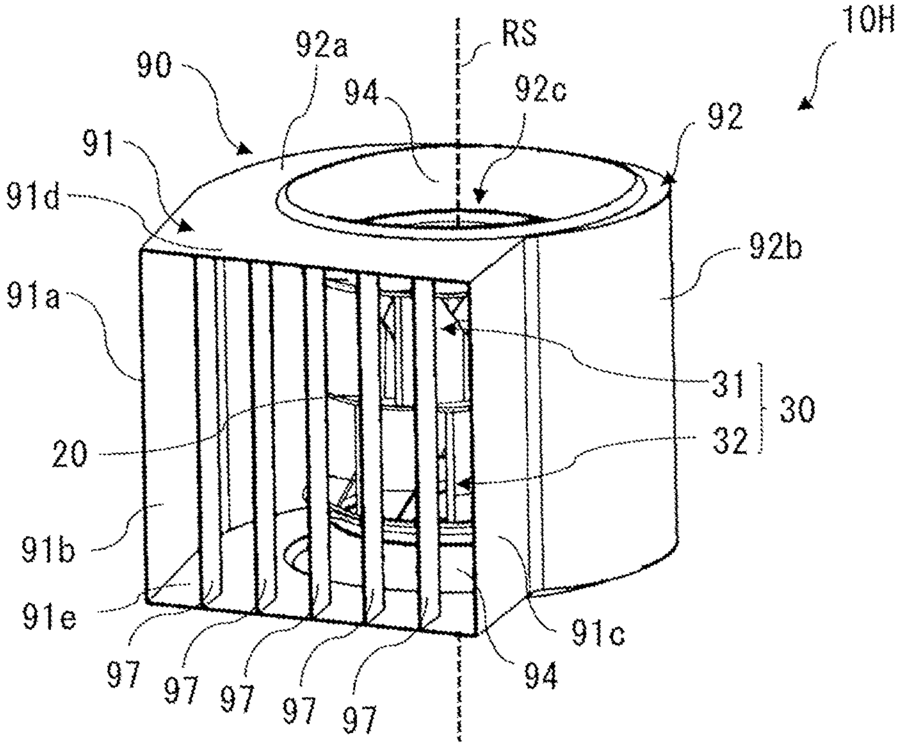
FIG. 21 is a perspective view of a turbo fan according to Embodiment 9 of the present disclosure.

FIG. 21 is a perspective view of a turbo fan 10H according to Embodiment 9 of the present disclosure. Note that components having the same configuration as in any of the turbo fan 10, the turbo fan 10A, the turbo fan 10B, the turbo fan 10C, the turbo fan 10D, the turbo fan 10E, the turbo fan 10F, and the turbo fan 10G in FIG. 1 to FIG. 20 are denoted by the same reference numerals, and descriptions of the components are omitted. The turbo fan 10H according to Embodiment 9 includes fins 97 in the air outlet 91*a* of the casing 90.

The discharge portion 91 of the casing 90 includes the fins 97 extending between the first side plate 91*d* and the second side plate 91*e*. The fins 97 are provided between wall portions configuring the air outlet 91*a*. The fins 97 are plate-shaped parts. The fins 97 are provided in parallel with the rotary shaft RS. One fin 97 may be provided or a plurality of fins 97 may be provided. In a case where the plurality of fins 97 are provided, the plurality of fins 97 are arranged side by side and in parallel with one another between the extension plate 91*b* and the diffuser plate 91*c*.

Figure 22:
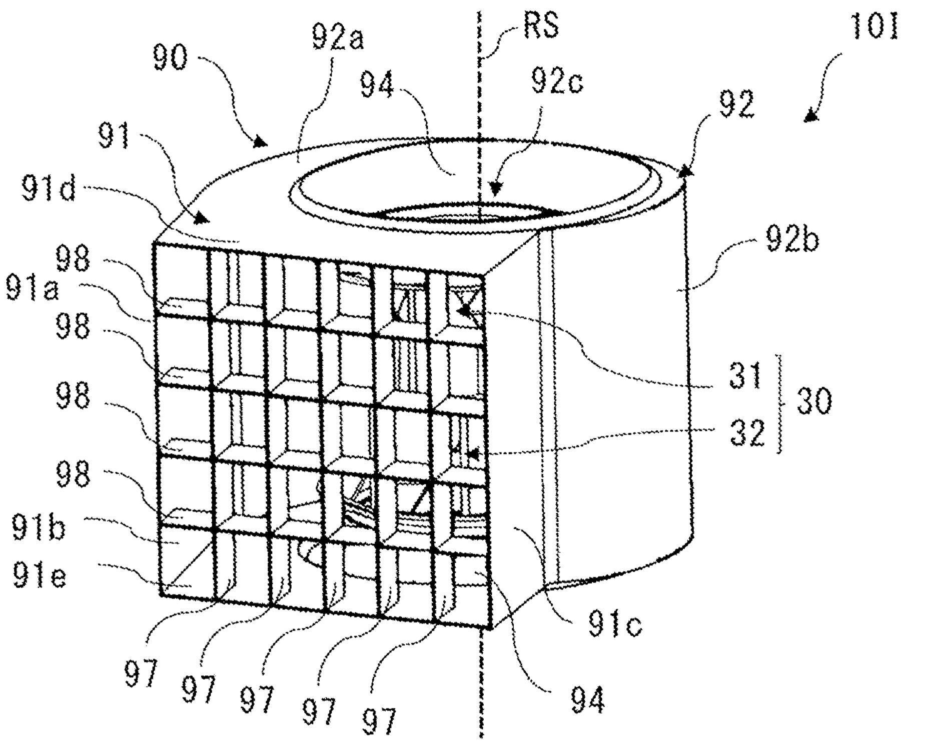
FIG. 22 is a perspective view of a modification of the turbo fan according to Embodiment 9 of the present disclosure.

FIG. 22 is a perspective view of a modification of the turbo fan 10H according to Embodiment 9 of the present disclosure. A turbo fan 10I of the modification further includes fins 98 orthogonally intersecting with the fins 97. In other words, in the turbo fan 10I, the discharge portion 91 of the casing 90 includes the fins 97 extending between the first side plate 91*d* and the second side plate 91*e* and the fins 98 extending between the extension plate 91*b* and the diffuser plate 91*c*, The fins 98 are also provided between the wall portions configuring the air outlet 91*a*. Accordingly, the turbo fan 10I of the modification includes a lattice-shaped fin group including the fins 97 and the fins 98 in the discharge portion 91 of the casing 90. The fins 98 are plate-shaped parts. One fin 98 may be provided or a plurality of fins 98 may be provided. In a case where the plurality of fins 98 are provided, the plurality of fins 98 are arranged side by side and in parallel with one another between the first side plate 91*d* and the second side plate 91*e*.

[Action and Effects of Turbo Fan 10H and Turbo Fan 10I]

As described above, the turbo fan 10H includes the fins 97 extending between the first side plate 91*d* and the second side plate 91*e* in the discharge portion 91 of the casing 90. Therefore, for example, in a case where the turbo fan 10H is installed inside an indoor unit of an air-conditioning device, the flowing direction of the airflows discharged from the turbo fan 10H can be directed to a heat exchanger, which makes it possible to improve efficiency of heat exchange. The turbo fan 10I includes the fins 97 and the fins 98 provided in the lattice shape in the discharge portion 91 of the casing 90. Therefore, the flowing direction of the airflows discharged from the turbo fan 10I can be further specified, which makes it possible to further improve efficiency of a unit in which the turbo fan 10I is installed.

Embodiment 10

Figure 23:
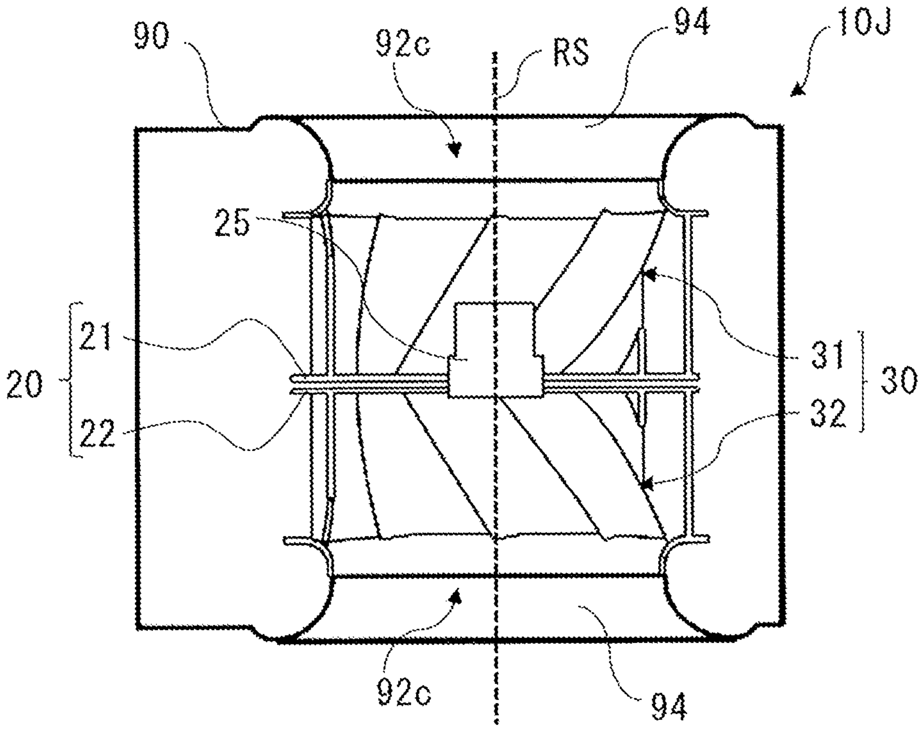
FIG. 23 is a schematic cross-sectional view of a turbo fan according to Embodiment 10 of the present disclosure.

FIG. 23 is a schematic cross-sectional view of a turbo fan 10J according to Embodiment 10 of the present disclosure. The main plate 20 of the turbo fan 10J includes two plate materials that are a first plate portion 21 on which the first blade portions 31 are arranged and a second plate portion 22 facing the first plate portion 21 and on which the second blade portions 32 are arranged. In the turbo fan 10J, the first plate portion 21 and the second plate portion 22 are disposed in parallel with each other, and the boss portion 25 is provided at center parts of the first plate portion 21 and the second plate portion 22 to couple the first plate portion 21 and the second plate portion 22. One of surfaces of each of the first plate portion 21 and the second plate portion 22 is provided with the blade portions 30, and the other surfaces of the first plate portion 21 and the second plate portion 22 not provided with the blade portions 30 face each other. The surface of the first plate portion 21 not provided with the blade portions 30 and the surface of the second plate portion 22 not provided with the blade portions 30 may be contacted with and fixed to each other, or a gap may be provided between the surface of the first plate portion 21 not provided with the blade portions 30 and the surface of the second plate portion 22 not provided with the blade portions 30. The main plate 20 may include one plate material as in any of the turbo fans 10 to 10I according to Embodiments 1 to 9, or the main plate 20 may include two plate materials of the first plate portion 21 and the second plate portion 22 as in the turbo fan 10J.

[Action and Effects of Turbo Fan 10J]

As described above, since the main plate 20 of the turbo fan 10J includes the first plate portion 21 and the second plate portion 22, the turbo fan 10J can be configured by combining two existing turbo fans each including the blade portions 30 on one of surfaces of the main plate 20. Further, although the main plate 20 of the turbo fan 10J includes the first plate portion 21 and the second plate portion 22, the turbo fan 10J can be realized by a small configuration by providing the motor on the outside of the casing 90. In addition, in the turbo fan 10J, the first plate portion 21 and the second plate portion 22 are disposed in parallel with each other, and the boss portion 25 is provided at the center parts of the first plate portion 21 and the second plate portion 22 to couple the first plate portion 21 and the second plate portion 22. Therefore, it is sufficient to provide one motor coupled with the boss portion 25, which makes it possible to reduce the number of used motors as compared with a case where motors are coupled with the respective existing turbo fans each including the blade portions 30 on one of surfaces of the main plate 20.

Embodiment 11

[Air-Sending Device 130]

Figure 24:
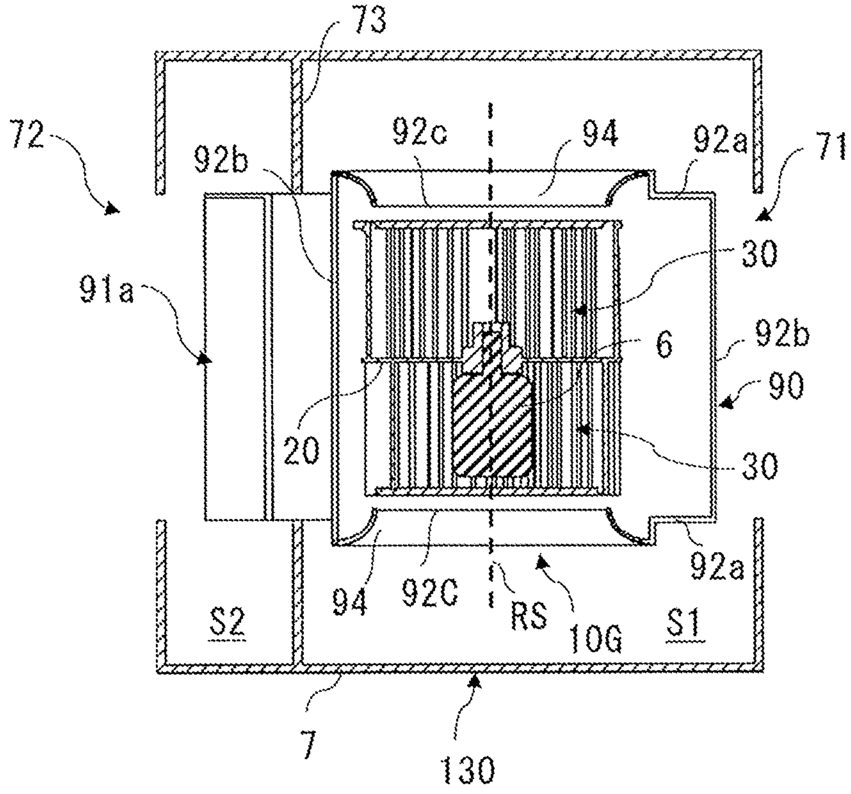
FIG. 24 is a diagram illustrating a configuration of an air-sending device according to Embodiment 11 of the present disclosure.

FIG. 24 is a diagram illustrating a configuration of an air-sending device 130 according to Embodiment 11 of the present disclosure. Note that components having the same configuration as in any of the turbo fans 10 to 10J in FIG. 1 to FIG. 23 are denoted by the same reference numerals, and descriptions of the components are omitted. The air-sending device 130 according to Embodiment 11 is, for example, a ventilator or a tabletop fan. The air-sending device 130 according to Embodiment 11 includes any one of the turbo fans 10 to 10J according to Embodiments 1 to 10, and a case 7 that houses any of the turbo fans 10 to 10J according to Embodiments 1 to 10. In the following description, in a case where the turbo fan 10G is used, any one of the turbo fans 10 to 10J according to Embodiments 1 to 10 may be used. The case 7 includes two opening ports of an air inlet 71 and an air outlet 72. As illustrated in FIG. 24, the air inlet 71 and the air outlet 72 of the air-sending device 130 are provided at positions opposite to each other. Note that the air inlet 71 and the air outlet 72 of the air-sending device 130 may not necessarily provided at the positions opposite to each other, for example, any one of the air inlet 71 and the air outlet 72 may be provided at an upper part or a lower part of the turbo fan 10G. In an inside of the case 7, a space S1 including a portion provided with the air inlet 71 and a space S2 including a portion provided with the air outlet 72 are partitioned by a partition 73. The turbo fan 10G is installed in a state where the air inlets 92*c* are positioned in the space S1 provided with the air inlet 71 and the air outlet 91*a* is positioned in the space S2 provided with the air outlet 72. In FIG. 24, the turbo fan 10G including the casing 90 is installed inside the case 7; however, the turbo fan 10 or other turbo fan including no casing 90 may be installed inside the case 7.

When the blade portions 30 rotate by driving of a motor 6 in the air-sending device 130, air is suctioned into the case 7 through the air inlet 71. The air suctioned into the case 7 is guided by the bell mouths 94, and is suctioned into the blade portions 30. The air suctioned into the blade portions 30 is blown out outward in the radial direction of the blade portions 30. The air blown out from the blade portions 30 passes through the inside of the casing 90, is then blown out from the air outlet 91*a* of the casing 90, and is blown out from the air outlet 72 of the case 7.

Since the air-sending device 130 according to Embodiment 11 includes any one of the turbo fans 10 to 10J according to Embodiments 1 to 10, the air-sending device 130 can realize noise reduction.

Embodiment 12

[Air-Conditioning Device 140]

Figure 25:
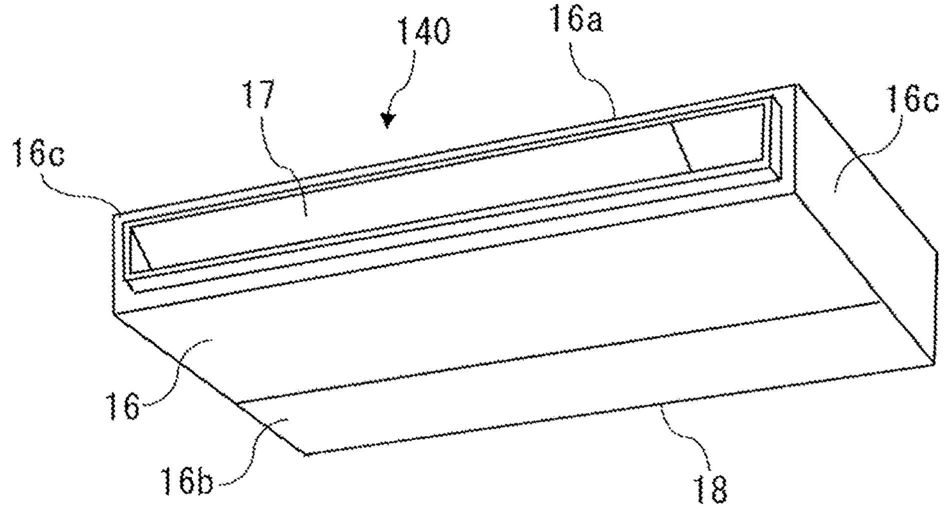
FIG. 25 is a perspective view of an air-conditioning device according to Embodiment 12 of the present disclosure.
Figure 26:
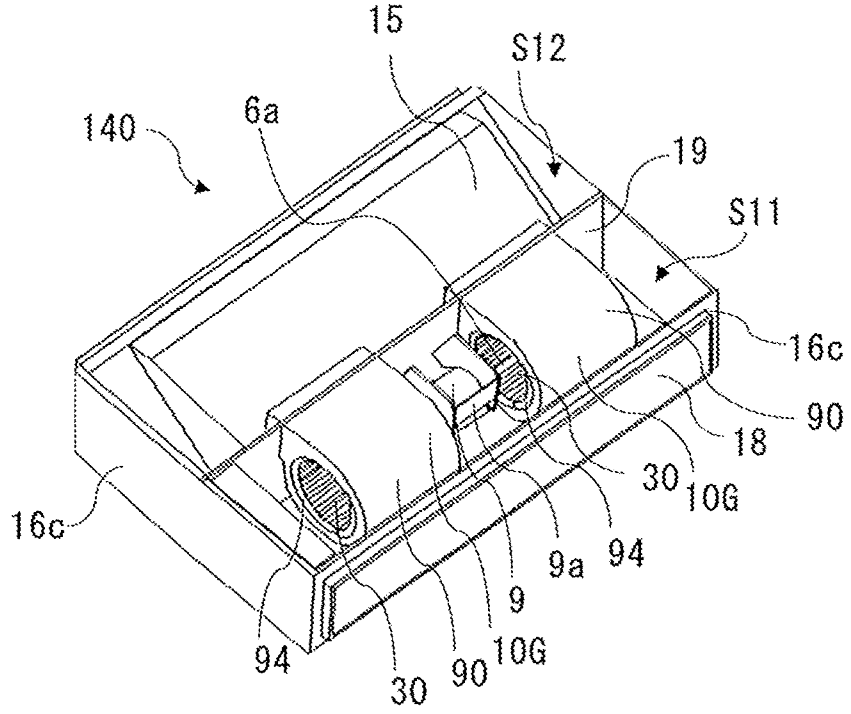
FIG. 26 is a diagram illustrating an internal configuration of the air-conditioning device according to Embodiment 12 of the present disclosure.
Figure 27:
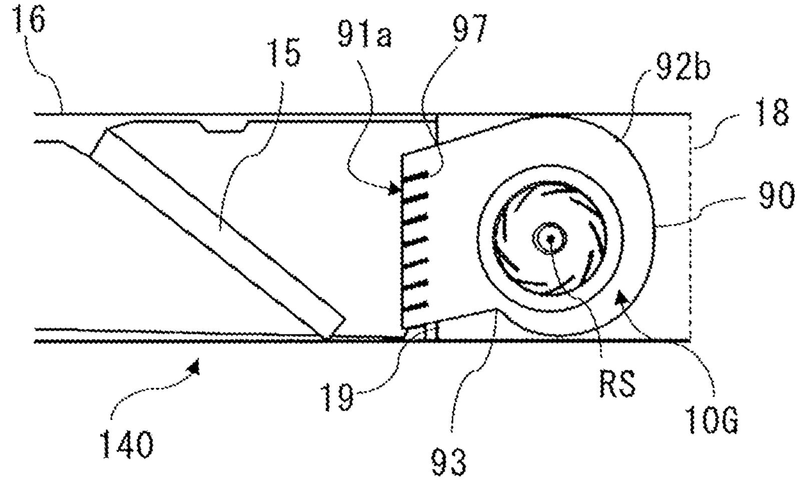
FIG. 27 is a cross-sectional view of the air-conditioning device according to Embodiment 12 of the present disclosure.
Figure 28:
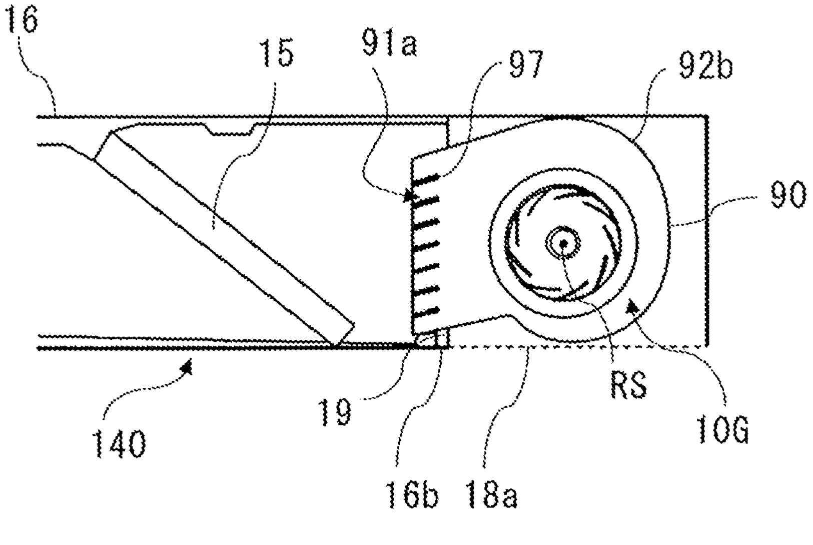
FIG. 28 is another cross-sectional view of the air-conditioning device according to Embodiment 12 of the present disclosure.

FIG. 25 is a perspective view of an air-conditioning device 140 according to Embodiment 12 of the present disclosure. FIG. 26 is a diagram illustrating an internal configuration of the air-conditioning device 140 according to Embodiment 12 of the present disclosure. FIG. 27 is a cross-sectional view of the air-conditioning device 140 according to Embodiment 12 of the present disclosure. FIG. 28 is another cross-sectional view of the air-conditioning device 140 according to Embodiment 12 of the present disclosure. In the turbo fan 10G used in the air-conditioning device 140 according to Embodiment 12, components having the same configuration as in any of the turbo fans 10 to 10J in FIG. 1 to FIG. 29 are denoted by the same reference numerals, and descriptions of the components are omitted. Further, in FIG. 26, to illustrate the internal configuration of the air-conditioning device 140, illustration of an upper surface portion 16*a* is omitted. The air-conditioning device 140 according to Embodiment 12 includes one or more of the turbo fans 10 to 10J according to Embodiments 1 to 10, and a heat exchanger 15 disposed at a position facing the air outlets 91*a* of the turbo fans 10G. The air-conditioning device 140 according to Embodiment 12 further includes a case 16 installed above a ceiling of an air-conditioned room. In the following description, in a case where the turbo fan 10G is used, any one of the turbo fans 10 to 10J according to Embodiments 1 to 10 may be used. Note that FIG. 25 to FIG. 28 illustrate the turbo fans 10G each including the casing 90 inside the case 16; however, the turbo fan 10 or other turbo fan including no casing 90 may be installed inside the case 16.

(Case 16)

As illustrated in FIG. 25, the case 16 has a cuboid shape including the upper surface portion 16*a*, a lower surface portion 16*b*, and side surface portions 16*c*. The shape of the case 16 is not limited to the cuboid shape, and the case 16 may have the other shapes, for example, a columnar shape, a prism shape, a conical shape, a shape having a plurality of corners, or a shape having a plurality of curved surface portions. The case 16 includes, as one of the side surface portions 16*c*, the side surface portion 16*c* provided with a case air outlet 17. The case air outlet 17 has a rectangular shape as illustrated in FIG. 25. The shape of the case air outlet 17 is not limited to the rectangular shape, and the case air outlet 17 may have the other shapes such as a circular shape and an oval shape. The case 16 has the side surface portion 16*c* provided with a case air inlet 18 on a surface opposite to the surface provided with the case air outlet 17. The case air inlet 18 has a rectangular shape as illustrated in FIG. 26. The shape of the case air inlet 18 is not limited to the rectangular shape, and the case air inlet 18 may have the other shapes such as a circular shape and an oval shape. The case air inlet 18 may be provided with a filter removing dust in the air.

The two turbo fans 10G, the fan motor 9, and the heat exchanger 15 are housed inside the case 16. Each of the turbo fans 10G includes the blade portions 30 and the casing 90 provided with the bell mouths 94. The fan motor 9 is supported by a motor support 9*a* fixed to the upper surface portion 16*a* of the case 16. The fan motor 9 has an output shaft 6*a*. The output shaft 6*a* is disposed to extend in parallel with the surface provided with the case air inlet 18 and the surface provided with the case air outlet 17 among the side surface portions 16*c*. As illustrated in FIG. 26, in the air-conditioning device 140, the two turbo fans 10G are attached to the output shaft 6*a*. The blade portions 30 of the turbo fans 10G form flows of the air that is suctioned from the case air inlet 18 into the case 16 and is blown out from the case air outlet 17 to an air-conditioned space. The number of turbo fans 10G disposed inside the case 16 is not limited to two, and may be one or three or more. In the case where two or more turbo fans 10G are disposed, the turbo fans may be two or more of the turbo fans 10 to 10J according to Embodiments 1 to 10.

As illustrated in FIG. 26, the turbo fans 10G are attached to a partition 19, and the internal space of the case 16 is partitioned by the partition 19 into a space S11 on the suction side of the casing 90 and a space S12 on the blowout side of the casing 90.

As illustrated in FIG. 27, the heat exchanger 15 is disposed at a position facing the air outlets 91*a* of the turbo fans 10G, and is disposed on air passages of the air discharged from the turbo fans 10G inside the case 16. The heat exchanger 15 adjusts a temperature of the air that is suctioned from the case air inlet 18 into the case 16 and is blown out from the case air outlet 17 to the air-conditioned space. The heat exchanger 15 can adopt a well-known configuration. It is sufficient to provide the case air inlet 18 at a position perpendicular to the axial direction of the rotary shaft RS of each of the turbo fans 10G, and for example, a case air inlet 18*a* may be provided on the lower surface portion 16*b* as illustrated in FIG. 28.

When the blade portions 30 rotate together with the main plates 20, the air in the air-conditioned space is suctioned into the case 16 through the case air inlet 18 or the case air inlet 18*a*. The air suctioned into the case 16 is guided by the bell mouths 94 and is suctioned into the blade portions 30. The air suctioned into the blade portions 30 is blown out outward in the radial direction of the blade portions 30. The air blown out from the blade portions 30 passes through the inside of the casing 90, is then blown out from the air outlets 91*a* of the casings 90, and is supplied to the heat exchanger 15. At this time, when the casing 90 has the fins 97, or the fins 97 and the fins 98, the airflows are easily guided from the turbo fans 10G to the heat exchanger 15. The air supplied to the heat exchanger 15 is subjected to heat exchange when passing through the heat exchanger 15, and is adjusted in temperature and humidity. The air passing through the heat exchanger 15 is blown out from the case air outlet 17 to the air-conditioned space.

Since the air-conditioning device 140 according to Embodiment 12 includes any one of the turbo fans 10 to 10J according to Embodiments 1 to 10, the air-conditioning device 140 can realize noise reduction.

Embodiment 13

[Refrigeration Cycle Device 150]

Figure 29:
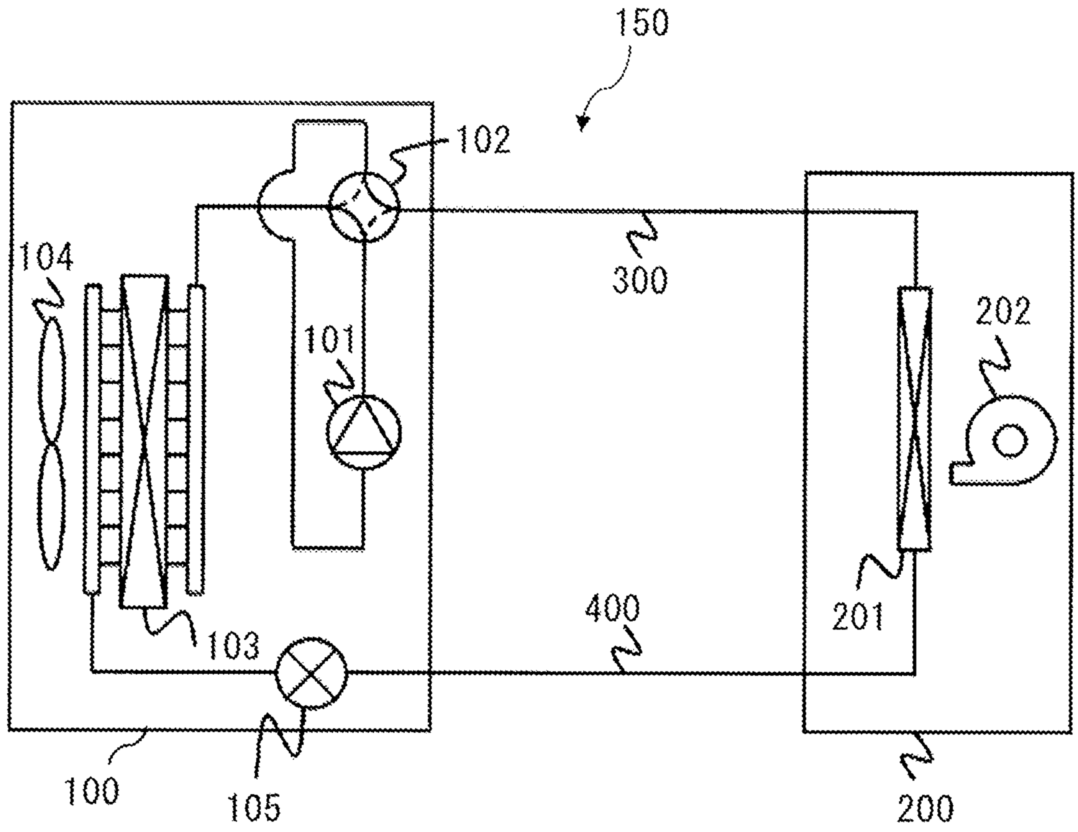
FIG. 29 is a diagram illustrating a configuration of a refrigeration cycle device according to Embodiment 13 of the present disclosure.

FIG. 29 is a diagram illustrating a configuration of a refrigeration cycle device 150 according to Embodiment 13 of the present disclosure. One or more of the turbo fans 10 to 10J according to Embodiments 1 to 10 are used for an indoor unit 200 of the refrigeration cycle device 150 according to Embodiment 13. Further, in the following description, a case where the refrigeration cycle device 150 is used for air conditioning is described; however, the use application of the refrigeration cycle device 150 is not limited to air conditioning. The refrigeration cycle device 150 is used for refrigeration and air conditioning, for example, a refrigerator, a freezer, a vending machine, an air-conditioning device, a refrigeration device, and a water heater.

The refrigeration cycle device 150 according to Embodiment 13 performs air conditioning by moving heat between outside air and indoor air through refrigerant to heat or cool an inside of a room. The refrigeration cycle device 150 according to Embodiment 13 includes an outdoor unit 100 and an indoor unit 200. In the refrigeration cycle device 150, the outdoor unit 100 and the indoor unit 200 are connected by a refrigerant pipe 300 and a refrigerant pipe 400 to configure a refrigerant circuit through which the refrigerant circulates. The refrigerant pipe 300 is a gas pipe through which gas-phase refrigerant flows, and the refrigerant pipe 400 is a liquid pipe through which liquid-phase refrigerant flows. Note that two-phase gas-liquid refrigerant may flow through the refrigerant pipe 400. In the refrigerant circuit of the refrigeration cycle device 150, a compressor 101, a flow switching device 102, an outdoor heat exchanger 103, an expansion valve 105, and an indoor heat exchanger 201 are sequentially connected through the refrigerant pipes.

(Outdoor Unit 100)

The outdoor unit 100 includes the compressor 101, the flow switching device 102, the outdoor heat exchanger 103, and the expansion valve 105. The compressor 101 compresses suctioned refrigerant and discharges the compressed refrigerant. The compressor 101 may include an inverter device, and may have a configuration in which an operation frequency is changed by the inverter device to change a capacity of the compressor 101. The capacity of the compressor 101 is an amount of the refrigerant sent per unit time. The flow switching device 102 is, for example, a four-way valve, and switches a direction of a refrigerant flow path. The refrigeration cycle device 150 can realize heating operation or cooling operation by causing the flow switching device 102 to switch the flow of the refrigerant based on an instruction from a controller (not illustrated).

The outdoor heat exchanger 103 exchanges heat between the refrigerant and outdoor air. During the heating operation, the outdoor heat exchanger 103 functions as an evaporator, and exchanges heat between low-pressure refrigerant flowing from the refrigerant pipe 400 and the outdoor air, thereby evaporating and gasifying the refrigerant. During the cooling operation, the outdoor heat exchanger 103 functions as a condenser, and exchanges heat between the refrigerant compressed by the compressor 101 and flowing from the flow switching device 102 and the outdoor air, thereby condensing and liquefying the refrigerant. To enhance efficiency of the heat exchange between the refrigerant and the outdoor air, the outdoor heat exchanger 103 includes an outdoor air-sending device 104. The outdoor air-sending device 104 may include an inverter device, and an operation frequency of a fan motor may be changed to change a rotation speed of a fan. The expansion valve 105 is an expansion device (flow rate control unit). The expansion valve 105 functions as an expansion valve by adjusting a flow rate of the refrigerant flowing through the expansion valve 105, and changes an opening degree to adjust pressure of the refrigerant. For example, in a case where the expansion valve 105 is an electronic expansion valve, the opening degree is adjusted based on an instruction of the controller (not illustrated).

(Indoor Unit 200)

The indoor unit 200 includes the indoor heat exchanger 201 exchanging heat between the refrigerant and the indoor air, and an indoor air-sending device 202 that adjusts flow of the air, the heat of which is exchanged by the indoor heat exchanger 201. During the heating operation, the indoor heat exchanger 201 functions as a condenser, and exchanges heat between the refrigerant flowing from the refrigerant pipe 300 and the indoor air to condense and liquefy the refrigerant, and causes the refrigerant to flow out to the refrigerant pipe 400. During the cooling operation, the indoor heat exchanger 201 functions as an evaporator, and exchanges heat between the refrigerant put into a low-pressure state by the expansion valve 105 and the indoor air, causes the refrigerant to remove the heat of the air to evaporate and gasify the refrigerant, and causes the refrigerant to flow out to the refrigerant pipe 300. The indoor air-sending device 202 is provided to face the indoor heat exchanger 201. One or more of the turbo fans 10 to 10J according to Embodiments 1 to 10 are applied for the indoor air-sending device 202. An operation speed of the indoor air-sending device 202 is determined by user setting. The indoor air-sending device 202 may include an inverter device, and an operation frequency of a fan motor (not illustrated) may be changed to change the rotation speed of the main plate 20.

[Operation Example of Refrigeration Cycle Device 150]

Next, the cooling operation is described as an operation example of the refrigeration cycle device 150. The high-temperature high-pressure gas refrigerant compressed and discharged by the compressor 101 flows into the outdoor heat exchanger 103 through the flow switching device 102. The gas refrigerant flowing into the outdoor heat exchanger 103 is condensed by heat exchange with the outside air sent by the outdoor air-sending device 104, into low-temperature refrigerant, and the low-temperature refrigerant flows out from the outdoor heat exchanger 103. The refrigerant flowing out from the outdoor heat exchanger 103 is expanded and decompressed by the expansion valve 105, into low-temperature low-pressure two-phase gas-liquid refrigerant. The two-phase gas-liquid refrigerant flows into the indoor heat exchanger 201 of the indoor unit 200 and evaporates by heat exchange with the indoor air sent by the indoor air-sending device 202, into low-temperature low-pressure gas refrigerant, and the low-temperature low-pressure gas refrigerant flows out from the indoor heat exchanger 201. At this time, the indoor air cooled through heat removal by the refrigerant is blown out as air-conditioning air from an air outlet of the indoor unit 200 to the air-conditioned space. The gas refrigerant flowing out from the indoor heat exchanger 201 is suctioned into the compressor 101 through the flow switching device 102, and is compressed again. The above-described operation is repeated.

Next, the heating operation is described as an operation example of the refrigeration cycle device 150. The high-temperature high-pressure gas refrigerant compressed and discharged by the compressor 101 flows into the indoor heat exchanger 201 of the indoor unit 200 through the flow switching device 102. The gas refrigerant flowing into the indoor heat exchanger 201 is condensed by heat exchange with the indoor air sent by the indoor air-sending device 202, into low-temperature refrigerant, and the low-temperature refrigerant flows out from the indoor heat exchanger 201. At this time, the indoor air warmed by receiving heat from the gas refrigerant is blown out as the air-conditioning air from the air outlet of the indoor unit 200 to the air-conditioned space. The refrigerant flowing out from the indoor heat exchanger 201 is expanded and decompressed by the expansion valve 105, into low-temperature low-pressure two-phase gas-liquid refrigerant. The two-phase gas-liquid refrigerant flows into the outdoor heat exchanger 103 of the outdoor unit 100, evaporates by heat exchange with the outside air sent by the outdoor air-sending device 104 into low-temperature low-pressure gas refrigerant, and the low-temperature low-pressure gas refrigerant flows out from the outdoor heat exchanger 103. The gas refrigerant flowing out from the outdoor heat exchanger 103 is suctioned into the compressor 101 through the flow switching device 102, and is compressed again. The above-described operation is repeated.

Since the refrigeration cycle device 150 according to Embodiment 13 includes one or more of the turbo fans 10 to 10J according to Embodiments 1 to 10, the refrigeration cycle device 150 can realize noise reduction.

The configurations described in the above-described embodiments illustrate examples of the contents of the present disclosure. The configurations can be combined with other well-known techniques, and a part of the configurations can be omitted and modified without departing from the scope of the present disclosure.

REFERENCE SIGNS LIST

6: motor, 6*a*: output shaft, 7: case, 9: fan motor, 9*a*: motor support, 10: turbo fan, 10A: turbo fan, 10B: turbo fan, 10C: turbo fan, 10D: turbo fan, 10E: turbo fan, 10F: turbo fan, 10G: turbo fan, 10H: turbo fan, 10I: turbo fan, 10J: turbo fan, 15: heat exchanger, 16: case, 16*a*: upper surface portion, 16*b*: lower surface portion, 16*c*: side surface portion, 17: case air outlet, 18: case air inlet, 18*a*: case air inlet, 19: partition, 20: main plate, 21: first plate portion, 22: second plate portion, 25: boss portion, 30: blade portion, 30A: blade portion, 30B: blade portion, 30C: blade portion, 30D: blade portion, 30E: blade portion, 30E1: front end part, 30E2: base part, 30E3: air inlet, 30E4: inclined part, 30F: blade portion, 31: first blade portion, 31A: first blade portion, 31B: first blade portion, 31C: first blade portion, 31C1: first reference blade portion, 31C2: third blade portion, 31D: first blade portion, 31D1: first reference blade portion, 31D2: third blade portion, 32: second blade portion, 32A: second blade portion, 32B: second blade portion, 32C: second blade portion, 32C1: fourth blade portion, 32D: second blade portion, 32D1: fourth blade portion, 33: first outer peripheral end part, 33A: third outer peripheral end part, 34: second outer peripheral end part, 34A: fourth outer peripheral end part, 35: first inner peripheral end part, 36: second inner peripheral end part, 50: side plate, 50*a*: air inlet, 50*c*: outer peripheral ring, 71: air inlet, 72: air outlet, 73: partition, 90: casing, 90A: casing, 91: discharge portion, 91*a*: air outlet, 91*b*: extension plate, 91*c*: diffuser plate, 91*d*: first side plate, 91*e*: second side plate, 92: scroll portion, 92*a*: side wall, 92*b*: peripheral wall, 92*c*: air inlet, 93: tongue portion, 94: bell mouth, 97: fin, 98: fin, 100: outdoor unit, 101: compressor, 102: flow switching device, 103: outdoor heat exchanger, 104: outdoor air-sending device, 105: expansion valve, 130: air-sending device, 140: air-conditioning device, 150: refrigeration cycle device, 200: outdoor unit, 201: indoor heat exchanger, 202: indoor air-sending device, 300: refrigerant pipe, 400: refrigerant pipe

The invention claimed is:

1. A turbo fan, comprising:
a main plate rotationally driven; and
a plurality of blade portions arranged at intervals in a circumferential direction on the main plate,
wherein
the plurality of blade portions include a plurality of first blade portions arranged on one of plate surfaces of the main plate, and a plurality of second blade portions arranged on another plate surface of the main plate,
in a case where, in each of the plurality of first blade portions, a length of a virtual straight line connecting a first inner peripheral end part positioned on a rotary shaft side in a radial direction of the main plate and a first outer peripheral end part positioned on an outer edge side of the main plate is defined as a first chord length, and in each of the plurality of second blade portions, a length of a virtual straight line connecting a second inner peripheral end part positioned on the rotary shaft side in the radial direction of the main plate and a second outer peripheral end part positioned on the outer edge side of the main plate is defined as a second chord length, the first chord length and the second chord length are not equal to each other at positions separated by a same distance from the main plate in the axial direction of the rotary shaft, and
in a case where
one of the plurality of first blade portions is defined as a first reference blade portion,
in the rotation direction of the main plate, among the plurality of first blade portions, the first blade portion disposed adjacent to the first reference blade portion in the circumferential direction is defined as a third blade portion,
when the rotary shaft is viewed in an axial direction, among the plurality of second blade portions, the second blade portion disposed at a position closest to the first reference blade portion in the circumferential direction of the main plate is defined as a fourth blade portion,
the first outer peripheral end part of the third blade portion is defined as a third outer peripheral end part,
the second outer peripheral end part of the fourth blade portion is defined as a fourth outer peripheral end part,
an advancing angle between the first outer peripheral end part of the first reference blade portion and the third outer peripheral end part of the third blade portion is defined as an angle θ3, and
an advancing angle between the first outer peripheral end part of the first reference blade portion and the fourth outer peripheral end part of the fourth blade portion is defined as an angle θ4,
a relationship of angle θ4≤±(angle θ3)/2 is established in the plurality of blade portions, and the first reference blade portion and the fourth blade portion are provided to intersect with each other with the main plate in between when the rotary shaft is viewed in the axial direction.

2. The turbo fan of claim 1, wherein
the first outer peripheral end parts and the second outer peripheral end parts of the plurality of blade portions are disposed at different positions in the radial direction of the main plate or are disposed at different positions in the circumferential direction of the main plate, and
the first inner peripheral end parts and the second inner peripheral end parts of the plurality of blade portions are disposed at different positions in the radial direction of the main plate or are disposed at different positions in the circumferential direction of the main plate.

3. The turbo fan of claim 1, wherein
the first outer peripheral end parts and the second outer peripheral end parts of the plurality of blade portions are disposed at different positions in the radial direction of the main plate or are disposed at different positions in the circumferential direction of the main plate, and
the first inner peripheral end parts and the second inner peripheral end parts of the plurality of blade portions are disposed at a same position in the radial direction of the main plate and are disposed at a same position in the circumferential direction of the main plate.

4. The turbo fan of claim 1, wherein the first inner peripheral end parts and the second inner peripheral end parts of the plurality of blade portions are disposed at different positions in the radial direction of the main plate or are disposed at different positions in the circumferential direction of the main plate.

5. The turbo fan of claim 1, wherein the first outer peripheral end parts and the second outer peripheral end parts of the plurality of blade portions are disposed at a same position in the radial direction of the main plate and are disposed at different positions in the circumferential direction of the main plate.

6. The turbo fan of claim 1, wherein the main plate includes a first plate portion on which the plurality of first blade portions are arranged and a second plate portion facing the first plate portion and on which the plurality of second blade portions are arranged.

7. The turbo fan of claim 1, further comprising a casing housing the main plate and the plurality of blade portions, and including an air inlet from which air to be suctioned into the plurality of blade portions is taken in and an air outlet from which air sent by the plurality of blade portions is discharged.

8. The turbo fan of claim 7, wherein the casing includes fins provided between wall portions configuring the air outlet.

9. The turbo fan of claim 8, wherein the fins are provided in a lattice shape in the air outlet.

10. An air-sending device, comprising:

the turbo fan of claim 1, and a case housing the turbo fan.

11. An air-conditioning device, comprising:

the turbo fan of claim 1, and a heat exchanger disposed at a position facing the turbo fan.

12. A refrigeration cycle device comprising the turbo fan of claim 1.

13. A turbo fan, comprising:

a main plate rotationally driven; and a plurality of blade portions arranged at intervals in a circumferential direction on the main plate, wherein the plurality of blade portions include a plurality of first blade portions arranged on one of plate surfaces of the main plate, and a plurality of second blade portions arranged on another plate surface of the main plate, in a case where, in each of the plurality of first blade portions, a length of a virtual straight line connecting a first inner peripheral end part positioned on a rotary shaft side in a radial direction of the main plate and a first outer peripheral end part positioned on an outer edge side of the main plate is defined as a first chord length, and in each of the plurality of second blade portions, a length of a virtual straight line connecting a second inner peripheral end part positioned on the rotary shaft side in the radial direction of the main plate and a second outer peripheral end part positioned on the outer edge side of the main plate is defined as a second chord length, the first chord length and the second chord length are not equal to each other at positions separated by a same distance from the main plate in the axial direction of the rotary shaft, each of the plurality of blade portions includes, in the axial direction of the rotary shaft, a front end part and a base part that is an end part on a side opposite to the front end part and is connected to the main plate, in a case where a blade outer diameter of the base parts is defined as a first blade outer diameter C and a blade outer diameter of the front end parts is defined as a second blade outer diameter D, the plurality of blade portions have relationship of second blade outer diameter D>first blade outer diameter C, in a case where a blade inner diameter of the base parts is defined as a first blade inner diameter E and a blade inner diameter of the front end parts is defined as a second blade inner diameter F, the plurality of blade portions have relationship of second blade inner diameter F>first blade inner diameter E, and each of the plurality of blade portions has relationship of blade inlet angle $\theta \leq 90$ degrees.

14. A turbo fan, comprising:

a main plate rotationally driven; and a plurality of blade portions arranged at intervals in a circumferential direction on the main plate, wherein the plurality of blade portions include a plurality of first blade portions arranged on one of plate surfaces of the main plate, and a plurality of second blade portions arranged on another plate surface of the main plate, in a case where, in each of the plurality of first blade portions, a length of a virtual straight line connecting a first inner peripheral end part positioned on a rotary shaft side in a radial direction of the main plate and a first outer peripheral end part positioned on an outer edge side of the main plate is defined as a first chord length, and in each of the plurality of second blade portions, a length of a virtual straight line connecting a second inner peripheral end part positioned on the rotary shaft side in the radial direction of the main plate and a second outer peripheral end part positioned on the outer edge side of the main plate is defined as a second chord length, the first chord length and the second chord length are not equal to each other at positions separated by a same distance from the main plate in the axial direction of the rotary shaft, each of the plurality of blade portions includes, in the axial direction of the rotary shaft, a front end part and a base part that is an end part on a side opposite to the front end part and is connected to the main plate, and in a case where a blade outlet angle at the base part of each of the plurality of blade portions is defined as a blade outlet angle Φ1 and a blade outlet angle at the front end part of each of the plurality of blade portions is defined as a blade outlet angle Φ2, each of the plurality of blade portions has relationship of blade outlet angle Φ1≥blade outlet angle Φ2.

* * * * *